United States Patent
Eleftheriadis et al.

(10) Patent No.: US 8,462,856 B2
(45) Date of Patent: Jun. 11, 2013

(54) SYSTEMS AND METHODS FOR ERROR RESILIENCE IN VIDEO COMMUNICATION SYSTEMS

(75) Inventors: Alexandros Eleftheriadis, Tenafly, NJ (US); Stephen Cipolli, Nanuet, NY (US); Jonathan Lennox, Jersey City, NJ (US)

(73) Assignee: Vidyo, Inc., Hackensack, NJ (US)

( * ) Notice: Subject to any disclaimer, the term of this patent is extended or adjusted under 35 U.S.C. 154(b) by 1300 days.

(21) Appl. No.: 11/971,769

(22) Filed: Jan. 9, 2008

(65) Prior Publication Data
US 2008/0165864 A1 Jul. 10, 2008

Related U.S. Application Data

(60) Provisional application No. 60/884,148, filed on Jan. 9, 2007.

(51) Int. Cl.
*H04N 7/26* (2006.01)

(52) U.S. Cl.
USPC .................................... 375/240.29

(58) Field of Classification Search
None
See application file for complete search history.

(56) References Cited

U.S. PATENT DOCUMENTS

| | | | |
|---|---|---|---|
| 5,555,244 A | | 9/1996 | Gupta et al. |
| 6,148,005 A * | | 11/2000 | Paul et al. ...................... 370/469 |
| 6,167,084 A | | 12/2000 | Wang et al. |
| 6,498,865 B1 | | 12/2002 | Brailean et al. |
| 6,912,584 B2 | | 6/2005 | Wang et al. |
| 6,937,770 B1 | | 8/2005 | Oguz et al. |
| 6,959,116 B2 | | 10/2005 | Sezer et al. |
| 6,973,622 B1 | | 12/2005 | Rappaport et al. |
| 7,146,056 B2 | | 12/2006 | Gunnewiek et al. |
| 7,359,558 B2 | | 4/2008 | Gunnewiek et al. |
| 7,400,889 B2 | | 7/2008 | Balasubramanian et al. |
| 7,421,127 B2 | | 9/2008 | Bruls et al. |
| 7,643,560 B2 | | 1/2010 | Hong et al. |
| 2001/0036321 A1 * | | 11/2001 | Kishi ............................ 382/240 |
| 2002/0163918 A1 | | 11/2002 | Cline |
| 2003/0074674 A1 | | 4/2003 | Magliaro et al. |
| 2003/0126238 A1 * | | 7/2003 | Kohno et al. ................. 709/220 |
| 2003/0135631 A1 | | 7/2003 | Li et al. |

(Continued)

FOREIGN PATENT DOCUMENTS

| | | |
|---|---|---|
| CA | 2507825 | 9/2004 |
| CA | 2515354 | 9/2004 |
| WO | WO03/063505 | 7/2003 |

OTHER PUBLICATIONS

U.S. Appl. No. 11/608,776, filed Dec. 8, 2006.

(Continued)

*Primary Examiner* — Thai Tran
*Assistant Examiner* — Sunghyoun Park
(74) *Attorney, Agent, or Firm* — Baker Botts L.L.P.

(57) ABSTRACT

Systems and methods for error resilient transmission and for random access in video communication systems are provided. The video communication systems are based on single-layer, scalable video, or simulcast video coding with temporal scalability, which may be used in video communication systems. A set of video frames or pictures in a video signal transmission is designated for reliable or guaranteed delivery to receivers using secure or high reliability links, or by retransmission techniques. The reliably-delivered video frames are used as reference pictures for resynchronization of receivers with the transmitted video signal after error incidence and for random access.

17 Claims, 19 Drawing Sheets

U.S. PATENT DOCUMENTS

| | | | |
|---|---|---|---|
| 2003/0138043 A1* | 7/2003 | Hannuksela | 375/240.08 |
| 2004/0001479 A1 | 1/2004 | Pounds et al. | |
| 2004/0042549 A1 | 3/2004 | Huang et al. | |
| 2004/0071354 A1 | 4/2004 | Adachi et al. | |
| 2004/0218816 A1 | 11/2004 | Hannuksela | |
| 2005/0135477 A1 | 6/2005 | Zhang et al. | |
| 2005/0147164 A1 | 7/2005 | Wu et al. | |
| 2005/0254575 A1 | 11/2005 | Hannuksela et al. | |
| 2005/0259729 A1 | 11/2005 | Sun | |
| 2005/0265450 A1 | 12/2005 | Raveendran et al. | |
| 2006/0010269 A1 | 1/2006 | Leibbrandt | |
| 2006/0078049 A1* | 4/2006 | Bao et al. | 375/240.11 |
| 2006/0282737 A1 | 12/2006 | Shi et al. | |
| 2007/0071090 A1* | 3/2007 | Peng et al. | 375/240.2 |
| 2007/0086521 A1* | 4/2007 | Wang et al. | 375/240.1 |
| 2010/0067579 A1 | 3/2010 | Bandoh et al. | |
| 2010/0132002 A1 | 5/2010 | Henocq et al. | |
| 2010/0189181 A1 | 7/2010 | Zheng et al. | |

OTHER PUBLICATIONS

U.S. Appl. No. 11/682,263, filed Mar. 5, 2007.
Eleftheriadis, et al., "SVC Error Resil Using Frame Index in NAL Unit Header", *ITU Study Group 16—Video Coding Experts Group—ISO/IEC MPEG & ITU-T VCEG*, No. JVT-V088, Jan. 10, 2007, XP030006896, Entire document.
Eleftheriadis, et al., "Improved Error Resilience Using Temporal Level 0 Picture Index", *ITU Study Group—16 Video Coding Experts Group—ISO/IEC MPEG & ITU-T VCEG*, No. JVT-W062, Apr. 27, 2007, XP030007022, Entire document.
Schwarz et al., "Overview of the Scalable Extension of the H.264/MPEG-4 AVC Video Coding Standard", Oct. 6, 2006, XP008108972.
Weigand, et al., "Joint Scalable Vidoe Model 8: Joint Draft 8 with Proposed Changes", *ITU Study Group 16—Video Coding Experts Group—ISO/IEC MPEG & ITU-T VCEG*, No. JVT-U202, Dec. 13, 2006, XP030006800 (paragraphs [G.7.3.1], [G.7.4.1]-[G7.4.2]).
Hannuksela, et al., "H.264/AVC in Wireless Enviroments", *IEEE Transactions on Circuits and Systems, for Video Technology, IEE Service Center*, vol. 13, No. 7, Jul. 1, 2003, pp. 657-673, XP011099258.
(ITU-T H.264) "ITU-T Recommendation H.264: Advanced Video Coding for Generic Audiovisual Services"in: International Relecommunication Union (On Line, {URL: http://www.itu.intlrec/TRec-H.264/en} 03/0 112005 entire document.
European Search Report issued on Aug. 3, 2010 in application No. EP08705806.1 (corresponding to US US20080165864A1).
U.S. Appl. No. 13/018,853, filed Feb. 1, 2011.
U.S. Appl. No. 11/682,263, Jun. 23, 2011 Restriction Requirement.
International Search Report and Written Opinion for PCT/US2011/023327 dated Mar. 28, 2011.
Partial European Search Report issued on Mar. 24, 2011 in application No. EP07757937.
JVT: "Joint Scalable Video Model JSVM4"; ITU Study Group 16—Video Coding Experts Group-ISO/IEC MPEG & ITU-T VCEG (ISO/IEC JTC1/SC29/WG11 and ITU-T SG 16 Q6), Document No. JVT-Q202, Nov. 18, 2005; Paragraphs [01.1], [02.1], [2.2], [0004]; XP030006256.
Chen et al., "SVC Frame Loss Concealment", ITU Study Group 16—Video Coding Experts Group-ISO/IEC MPEG & ITU-T VCEG (ISO/IEC JTC1/SC29/WG11 and ITU-T SG 16 Q6), Document No. JVT-Q046, Oct. 12, 2005; XP030006207.
Tian V Kumar MV Tampere International Ctr for Signal Processing (Finland) D et al.; "Improved H.264/AVC Video Broadcast/Multicast", Visual Communications and Image Processing; Jul. 15, 2005; XP030080844.
U.S. Appl. No. 13/238,624, filed Sep. 21, 2011.
U.S. Appl. No. 11/608,776, Oct. 27, 2011 Non-Final Office Action.
U.S. Appl. No. 11/682,263, Sep. 26, 2011 Non-Final Office Action.
Co-Pending U.S. Appl. No. 13/209,023, filed Aug. 12, 2011.
U.S. Appl. No. 11/608,776, Feb. 27, 2012 Response to Non-Final Office Action.
U.S. Appl. No. 11/682,263, May 8, 2012 Final Office Action.
U.S. Appl. No. 11/608,776, Jun. 22, 2012 Final Office Action.
U.S. Appl. No. 11/682,263, Mar. 26, 2012 Response to Non-Final Office Action.
U.S. Appl. No. 13/209,023, Dec. 13, 2012 Preliminary Amendment.
U.S. Appl. No. 11/682,263, Dec. 13, 2012 Supplemental Amendment.
U.S. Appl. No. 11/682,263, Oct. 9, 2012 Amendment and Request for Continued Examination (RCE).
U.S. Appl. No. 11/608,776, Dec. 21, 2012 Amendment and Request for Continued Examination (RCE).
Wenger, "Video Redundancy Coding in H.263+", *Proceedings AVSPN*, pp. 1-6, (1997) (XP002966435).
European Office Action for EP 08705806.1, dated Mar. 25, 2013 (Corresponds to U.S. Appl. No. 11/971,769).
Wenger, et al., "Extended RTP Profile for Real-Time Transport Control Protocol (RTCP)—Based Feedback (RTP/AVPF)", *J. Ott Helsinki University of Technology*, whole document (52 pages) (Jul. 1, 2006) (XP015055018).
Wenger, et al., "RTP Payload Format for H.264 Video", *RFC 3984*, pp. 34-47 (Feb. 1, 2005) (XP008135986).

\* cited by examiner

FIG. 17: RTP HEADER EXTENSION FOR RTP PACKETS
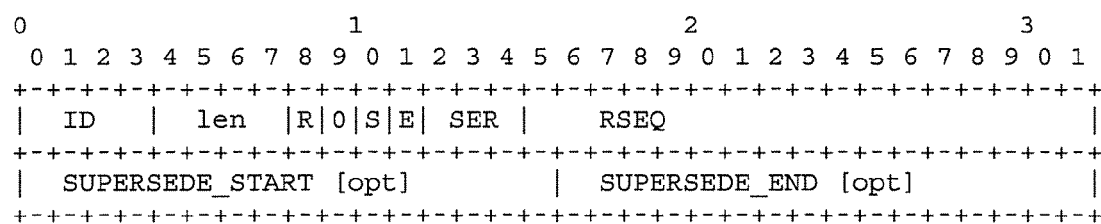

FIG. 18: RNACK FEEDBACK CONTROL INFORMATION (FCI) FIELD

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           RSEQ            |  SER  |   BLR                     |
+-+-+-+-+-+-+-+-+-+-+-+-+-+-+-+-+-+-+-+-+-+-+-+-+-+-+-+-+-+-+-+-+
```

FIG. 19: MODIFIED SVC NAL HEADER EXTENSION SYNTAX

| nal_unit_header_svc_extension( ) { | C | Descriptor |
|---|---|---|
| reserved_zero_two_bits | All | u(2) |
| priority_id | All | u(6) |
| temporal_id | All | u(3) |
| dependency_id | All | u(3) |
| quality_id | All | u(2) |
| layer_base_flag | All | u(1) |
| use_base_prediction_flag | All | u(1) |
| Discardable_flag | All | u(1) |
| pic_start_flag | All | u(1) |
| pic_end_flag | All | u(1) |
| tl0_pic_idx_present_flag | All | u(1) |
| fragment_data_present_flag | All | u(1) |
| reserved_zero_one_bit | All | u(1) |
| if( tl0_pic_idx_present_flag == 1 ) | | |
|     tl0_pic_idx | All | u(8) |
| if( fragment_data_present_flag) { | | |
|     fragmented_flag | All | u(1) |
|     Last_fragment_flag | All | u(1) |
|     fragment_order | All | u(2) |
|     reserved_zero_four_bits | All | u(4) |
| } | | |
| nalUnitHeaderBytes += ( 3 + ( tl0_pic_idx_present_flag ? 1 : 0 ) ) | | |
| } | | |

– END –

SYSTEMS AND METHODS FOR ERROR RESILIENCE IN VIDEO COMMUNICATION SYSTEMS

CROSS-REFERENCE TO RELATED APPLICATIONS

This application claims the benefit of U.S. provisional patent application Ser. No. 60/884,148 filed Jan. 9, 2007. Further, this application is related to International patent application Nos. PCT/US06/028365, PCT/US06/028366, PCT/US06/061815, PCT/US06/62569, PCT/US07/80089, PCT/US07/062,357, PCT/US07/065,554, PCT/US07/065,003, PCT/US06/028367, PCT/US07/063,335, PCT/US07/081,217, PCT/US07/080089, PCT/US07/083,351, PCT/US07/086958, and PCT/US07/089076. All of the aforementioned applications, which are commonly assigned, are hereby incorporated by reference herein in their entireties.

FIELD OF THE INVENTION

The present invention relates to video data communication systems. In particular, the invention relates to techniques for providing error resilience in videoconferencing applications.

BACKGROUND OF THE INVENTION

Providing high quality digital video communications between senders and receivers over packet-based modern communication networks (e.g., a network based on the Internet Protocol (IP)) is technically challenging, at least due to the fact that data transport on such networks is typically carried out on a best-effort basis. Transmission errors in modern communication networks generally manifest themselves as packet losses and not as bit errors, which were characteristic of earlier communication systems. The packet losses often are the result of congestion in intermediary routers, and not the result of physical layer errors.

When a transmission error occurs in a digital video communication system, it is important to ensure that the receiver can quickly recover from the error and return to an error-free display of the incoming video signal. However, in typical digital video communication systems, the receiver's robustness is reduced by the fact that the incoming data is heavily compressed in order to conserve bandwidth. Further, the video compression techniques employed in the communication systems (e.g., state-of-the-art codecs ITU-T H.264 and H.263 or ISO MPEG-2 and MPEG-4 codecs) can create a strong temporal dependency between sequential video packets or frames. In particular, use of motion compensated prediction (e.g., involving the use of P or B frames) codecs creates a chain of frame dependencies in which a displayed frame depends on past frame(s). The chain of dependencies can extend all the way to the beginning of the video sequence. As a result of the chain of dependencies, the loss of a given packet can affect the decoding of a number of the subsequent packets at the receiver. Error propagation due to the loss of the given packet terminates only at an "intra" (I) refresh point, or at a frame which does not use any temporal prediction at all.

Error resilience in digital video communication systems requires having at least some level of redundancy in the transmitted signals. However, this requirement is contrary to the goals of video compression techniques, which strive to eliminate or minimize redundancy in the transmitted signals.

On a network that offers differentiated services (e.g., DiffServ IP-based networks, private networks over leased lines, etc.), a video data communication application may exploit network features to deliver some or all of video signal data in a lossless or nearly lossless manner to a receiver. However, in an arbitrary best-effort network (such as the Internet) that has no provision for differentiated services, a data communication application has to rely on its own features for achieving error resilience. Known techniques (e.g., the Transmission Control Protocol—TCP) that are useful in text or alpha-numeric data communications are not appropriate for video or audio communications, which have the added constraint of low end-to-end delay arising out of human interface requirements. For example, TCP techniques may be used for error resilience in text or alpha-numeric data transport. TCP keeps on retransmitting data until confirmation that all data is received, even if it involves a delay of several seconds. However, TCP is inappropriate for video data transport in a live or interactive videoconferencing application because the end-to-end delay, which is unbounded, would be unacceptable to participants.

An aspect of error resilience in video communication systems relates to random access (e.g., when a receiver joins an existing transmission of a video signal), which has a considerable impact on compression efficiency. Instances of random access are, for example, a user who joins a videoconference, or a user who tunes in to a broadcast. Such a user would have to find a suitable point in the incoming bitstream signal to start decoding and be synchronized with the encoder. A random access point is effectively an error resilience feature since at that point any error propagation terminates (or is an error recovery point). Thus, a particular coding scheme, which provides good random access support, will generally have an error resilience technique that provides for faster error recovery. However, the converse depends on the specific assumptions about the duration and extent of the errors that the error resilience technique is designed to address. The error resilience technique may assume that some state information is available at the receiver at the time an error occurs. In such case, the error resilience technique does not assure good random access support.

In MPEG-2 video codecs for digital television systems (digital cable TV or satellite TV), I pictures are used at periodic intervals (typically 0.5 sec) to enable fast switching into a stream. The I pictures, however, are considerably larger than their P or B counterparts (typically by 3-6 times) and are thus to be avoided, especially in low bandwidth and/or low delay applications.

In interactive applications such as videoconferencing, the concept of requesting an intra update is often used for error resilience. In operation, the update involves a request from the receiver to the sender for an intra picture transmission, which enables the decoder to be synchronized. The bandwidth overhead of this operation is significant. Additionally, this overhead is also incurred when packet errors occur. If the packet losses are caused by congestion, then the use of the intra pictures only exacerbates the congestion problem.

Another traditional technique for error robustness, which has been used in the past to mitigate drift caused by mismatch in IDCT implementations (e.g., in the H.261 standard), is to periodically code each macroblock intra mode. The H.261 standard requires forced intra coding every 132 times a macroblock is transmitted.

The coding efficiency decreases with increasing percentage of macroblocks that are forced to be coded as intra in a given frame. Conversely, when this percentage is low, the time to recover from a packet loss increases. The forced intra coding process requires extra care to avoid motion-related drift, which further limits the encoder's performance since some motion vector values have to be avoided, even if they are the most effective.

In addition to traditional, single-layer codecs, layered or scalable coding is a well-known technique in multimedia data encoding. Scalable coding is used to generate two or more "scaled" bitstreams collectively representing a given medium in a bandwidth-efficient manner. Scalability can be provided in a number of different dimensions, namely temporally, spatially, and quality (also referred to as SNR "Signal-to-Noise Ratio" scalability). For example, a video signal may be scalably coded in different layers at CIF and QCIF resolutions, and at frame rates of 7.5, 15, and 30 frames per second (fps). Depending on the codec's structure, any combination of spatial resolutions and frame rates may be obtainable from the codec bitstream. The bits corresponding to the different layers can be transmitted as separate bitstreams (i.e., one stream per layer) or they can be multiplexed together in one or more bitstreams. For convenience in description herein, the coded bits corresponding to a given layer may be referred to as that layer's bitstream, even if the various layers are multiplexed and transmitted in a single bitstream. Codecs specifically designed to offer scalability features include, for example, MPEG-2 (ISO/IEC 13818-2, also known as ITU-T H.262) and the currently developed H.264 Scalable Video Coding extension (known as ITU-T H.264 Annex G or MPEG-4 Part 10 SVC). Scalable video coding (SVC) techniques specifically designed for video communication are described in commonly assigned international patent application No. PCT/US06/028365 "SYSTEM AND METHOD FOR SCALABLE AND LOW-DELAY VIDEOCONFERENCING USING SCALABLE VIDEO CODING". It is noted that even codecs that are not specifically designed to be scalable can exhibit scalability characteristics in the temporal dimension. For example, consider an MPEG-2 Main Profile codec, a non-scalable codec, which is used in DVDs and digital TV environments. Further, assume that the codec is operated at 30 fps and that a GOP structure of IBBPBBPBBPBBPBB (period N=15 frames) is used. By sequential elimination of the B pictures, followed by elimination of the P pictures, it is possible to derive a total of three temporal resolutions: 30 fps (all picture types included), 10 fps (I and P only), and 2 fps (I only). The sequential elimination process results in a decodable bitstream because the MPEG-2 Main Profile codec is designed so that coding of the P pictures does not rely on the B pictures, and similarly coding of the I pictures does not rely on other P or B pictures. In the following, single-layer codecs with temporal scalability features are considered to be a special case of scalable video coding, and are thus included in the term scalable video coding, unless explicitly indicated otherwise.

Scalable codecs typically have a pyramidal bitstream structure in which one of the constituent bitstreams (called the "base layer") is essential in recovering the original medium at some basic quality. Use of one or more the remaining bitstream(s) (called "the enhancement layer(s)") along with the base layer increases the quality of the recovered medium. Data losses in the enhancement layers may be tolerable, but data losses in the base layer can cause significant distortions or complete loss of the recovered medium.

Scalable codecs pose challenges similar to those posed by single layer codecs for error resilience and random access. However, the coding structures of the scalable codecs have unique characteristics that are not present in single layer video codecs. Further, unlike single layer coding, scalable coding may involve switching from one scalability layer to another (e.g., switching back and forth between CIF and QCIF resolutions).

Simulcasting is a coding solution for videoconferencing that is less complex than scalable video coding but has some of the advantages of the latter. In simulcasting, two different versions of the source are encoded (e.g., at two different spatial resolutions) and transmitted. Each version is independent, in that its decoding does not depend on reception of the other version. Like scalable and single-layer coding, simulcasting poses similar random access and robustness issues. In the following, simulcasting is considered a special case of scalable coding (where no inter layer prediction is performed) and both are referred to simply as scalable video coding techniques unless explicitly indicated otherwise.

Specific techniques for providing error resilience and random access in video communication systems are described in commonly assigned International patent application Nos. PCT/US06/061815, "SYSTEMS AND METHODS FOR ERROR RESILIENCE AND RANDOM ACCESS IN VIDEO COMMUNICATIONS SYSTEMS," and PCT/US07/063335, "SYSTEM AND METHOD FOR PROVIDING ERROR RESILIENCE, RANDOM ACCESS, AND RATE CONTROL IN SCALABLE VIDEO COMMUNICATIONS." Among other things, these patent applications disclose the concept of LR pictures, i.e., pictures that constitute the lowest temporal layer of a scalably coded video signal (at the lowest spatial or quality resolution) and which are transmitted reliably from a sender to a receiver. Reliable transmission of the LR pictures ensures a minimum level of quality at a receiving decoder. A receiver can immediately detect if an LR picture has been lost and take steps to obtain the lost picture (e.g., by requesting its retransmission from the sender) using, for example, a "key picture indices" mechanism, which is also disclosed in International patent application No. PCT/US06/061815. It is noted that the sender and receiver are not necessarily the encoder and decoder, respectively, but may be a Scalable Video Communication Server (SVCS) as disclosed in commonly assigned International patent application No. PCT/US06/028366, a Compositing SVCS (CSVCS) as disclosed in commonly assigned International patent application No. PCT/US06/62569, or a Multicast SVCS (MSVCS) as disclosed in commonly assigned International patent application No. PCT/US07/80089.

A potential limitation of the systems and methods described in International patent application No. PCT/US06/061815 occurs when the lowest temporal level pictures are transported over more than one packets. This may occur, for example, in coding high-definition video, where each frame may be transported using more than one transport-layer packets, or when a picture is coded using more than one slices and each slice is transported in its own packet. In these cases, all packets belonging to the same frame will have the same key picture index. If all slices are lost due to packet losses in the network, then a receiver can properly detect the loss of the entire picture and initiate corrective action. If, however, few or all of the slices are received, then a receiver can not immediately infer if the received slices contain the entire or only a partial picture, unless it proceeds to decode the slice data. This inference is straightforward in a receiver that decodes the received data, but it presents significant complexity for an intermediate receiver (e.g., an SVCS, CSVCS, or MSCVS, or any Media-Aware Network Element—MANE) that is normally not equipped to perform decoding of the video data.

Consideration is now being given to improving error resilience to the coded bitstreams in video communications systems. Attention is directed towards developing error resilience techniques which have a minimal impact on end-to-end delay and the bandwidth used by the system, and address the possibility of fragmentation of coded video data in multiple slices. Desirable error resilience techniques will be applicable to both scalable and single-layer video coding.

SUMMARY OF THE INVENTION

The present invention provides systems and methods to increase error resilience in video communication systems based on single-layer as well as scalable video coding. Specifically, the present invention provides a mechanism for a receiver to detect if portions of a picture that is intended to be transmitted reliably have been lost due to packet losses, so that corrective action can be initiated with minimal delay. Specific techniques are provided for transmission over RTP as well as when using H.264 Annex G (SVC) NAL units.

BRIEF DESCRIPTION OF THE DRAWINGS

FIG. 17 illustrates an exemplary structure for the named RTP header extension for RTP packets, in accordance with the principles of the present invention.

FIG. 18 illustrates an exemplary structure for the feedback control information field of RNACK packets, in accordance with the principles of the present invention.

FIG. 19 illustrates a modified H.264 Annex G (SVC) NAL header extension syntax with frame indices and start/end flags, in accordance with the principles of the present invention.

Figure 1:
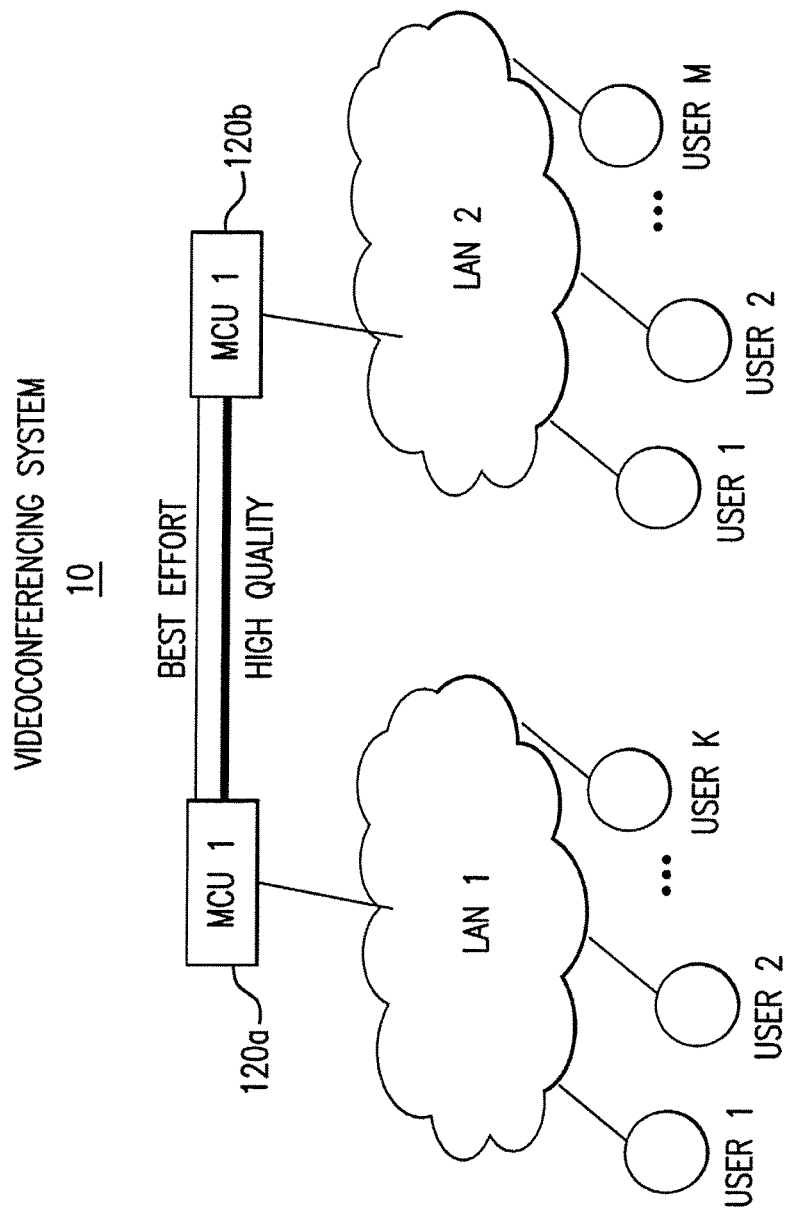
FIG. 1 is a block diagram illustrating an exemplary video conferencing system for delivering scalably coded video data, in accordance with the principles of the present invention.

Throughout the figures the same reference numerals and characters, unless otherwise stated, are used to denote like features, elements, components or portions of the illustrated embodiments. Moreover, while the present invention will now be described in detail with reference to the Figures, it is done so in connection with the illustrative embodiments.

DETAILED DESCRIPTION OF THE INVENTION

The present invention provides systems and methods for error resilient transmission in video communication systems. The mechanisms are compatible with scalable video coding techniques as well as single-layer and simulcast video coding with temporal scalability, which may be used in video communication systems.

The system and methods involve designating a set of video frames or pictures in a video signal transmission for reliable or guaranteed delivery to receivers. Reliable delivery of the designated set video frames may be accomplished by using secure or high reliability links, or by retransmission techniques. The reliably-delivered video frames are used as reference pictures for resynchronization of receivers with the transmitted video signal after error incidence or for random access.

In a preferred embodiment, an exemplary video communication system may be a multi-point videoconferencing system 10 operated over a packet-based network. (See e.g., FIG. 1). Multi-point videoconferencing system may include optional bridges 120a and 120b (e.g., Multipoint Control Unit (MCU) or Scalable Video Communication Server (SVCS)) to mediate scalable multilayer or single layer video communications between endpoints (e.g., users 1-k and 1-m) over the network. The operation of the exemplary video communication system is the same and as advantageous for a point-to-point connection with or without the use of optional bridges 120a and 120b.

A detailed description of scalable video coding techniques and videoconferencing systems based on scalable video coding is provided in commonly assigned International patent application No. PCT/US06/028365 "SYSTEM AND METHOD FOR SCALABLE AND LOW-DELAY VIDEOCONFERENCING USING SCALABLE VIDEO CODING", No. PCT/US06/028266 "SYSTEM AND METHOD FOR A CONFERENCE SERVER ARCHITECTURE FOR LOW DELAY AND DISTRIBUTED CONFERENCING APPLICATIONS", No. PCT/US/06/062569 "SYSTEM AND METHOD FOR VIDEOCONFERENCING USING SCALABLE VIDEO CODING AND COMPOSITING SCALABLE VIDEO SERVERS", and No. PCT/US07/80089 "SYSTEM AND METHOD FOR MULTIPOINT CONFERENCING WITH SCALABLE VIDEO CODING SERVERS AND MULTICAST". Further, descriptions of error resilience, random access, and rate control techniques are provided in commonly assigned International patent applications No. PCT/US06/061815 "SYSTEMS AND METHODS FOR ERROR RESILIENCE AND RANDOM ACCESS IN VIDEO COMMUNICATION SYSTEMS" and No. PCT/US07/063,335 "SYSTEM AND METHOD FOR PROVIDING ERROR RESILIENCE, RANDOM ACCESS, AND RATE CONTROL IN SCALABLE VIDEO COMMUNICATIONS". All of the aforementioned International patent applications are incorporated by reference herein in their entireties. The systems and methods of the present invention improve upon the systems and methods described in International patent application No. PCT/US06/61815.

FIG. 1 shows the general structure of a videoconferencing system 10. Videoconferencing system 10 includes a plurality of end-user terminals (e.g., users 1-k and users 1-m) that are linked over a network 100 via LANS 1 and 2 and servers 120a and 120b. The servers may be traditional MCUs, Scalable Video Communication Servers (SVCS), Compositing Scalable Video Communication Servers (CSVCS), or Multicast Scalable Video Communication Servers (MSVCS). The latter servers have the same purpose as traditional MCUs, but with significantly reduced complexity and improved functionality. (See e.g., International patent application No. PCT/US06/28366). In the description herein, the term "server" may be used generically to refer to any of the SVCS types.

Figure 2:
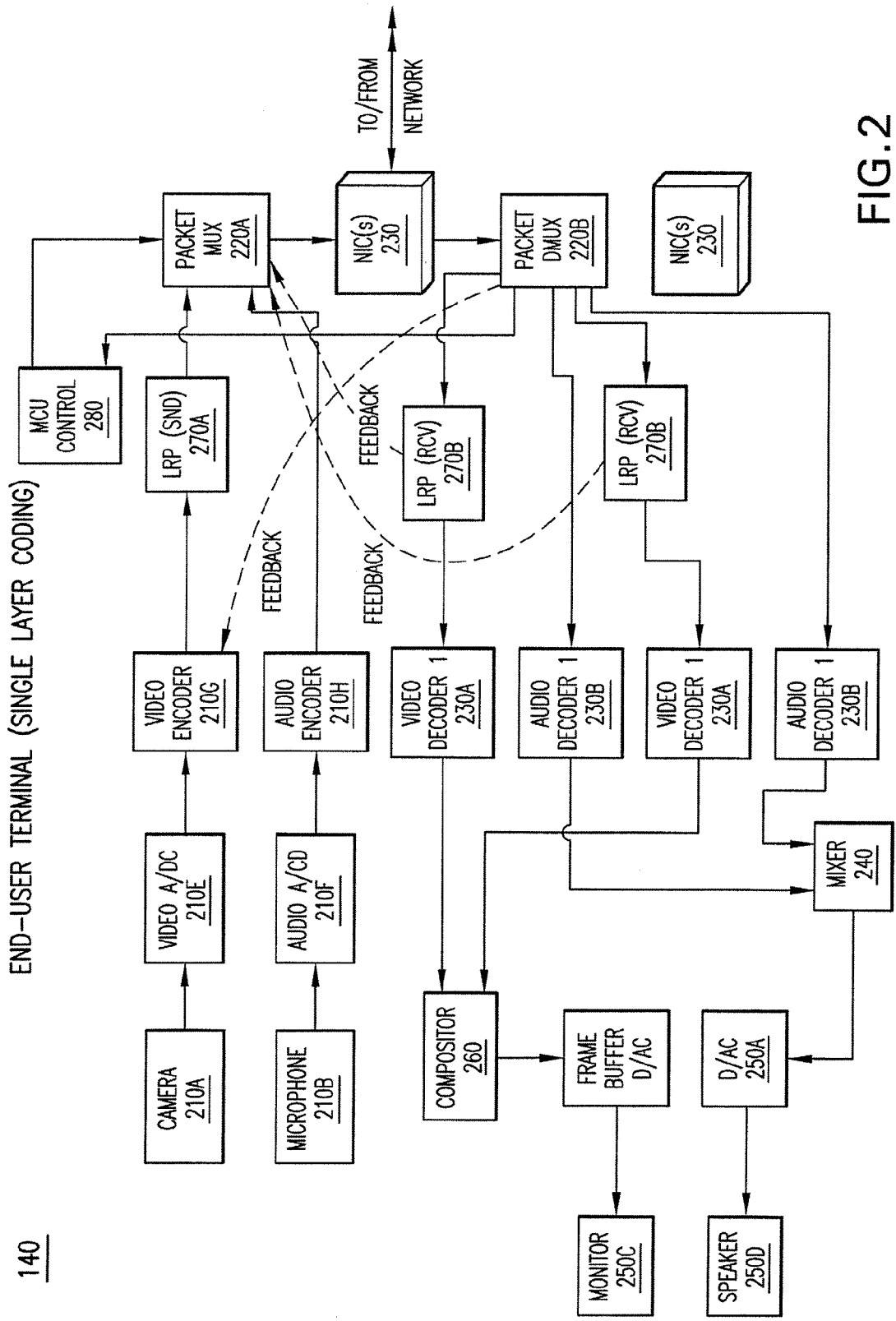
FIG. 2 is a block diagram illustrating an exemplary end-user terminal compatible with the use of single layer video coding, in accordance with the principles of the present invention.
Figure 3:
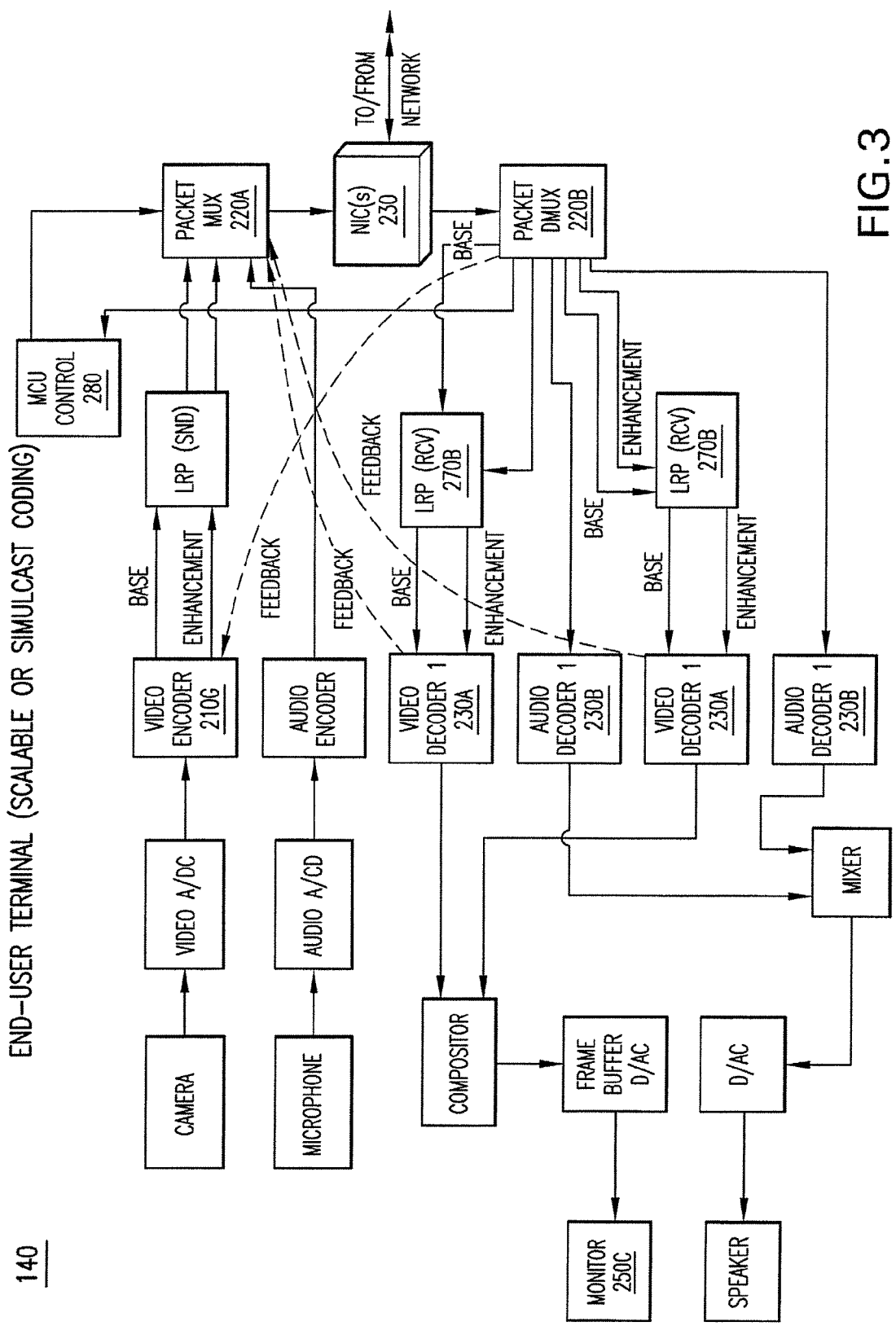
FIG. 3 is a block diagram illustrating an exemplary end-user terminal compatible with the use of scalable or simulcast coding, in accordance with the principles of the present invention.

FIG. 2 shows the architecture of an end-user terminal 140, which is designed for use with videoconferencing systems (e.g., system 100) based on single layer coding. Similarly, FIG. 3 shows the architecture of an end-user terminal 140, which is designed for use with videoconferencing systems (e.g., system 10) based on multi layer coding. Terminal 140 includes human interface input/output devices (e.g., a camera 210A, a microphone 210B, a video display 250C, a speaker 250D), and one or more network interface controller cards (NICs) 230 coupled to input and output signal multiplexer and demultiplexer units (e.g., packet MUX 220A and packet DMUX 220B). NIC 230 may be a standard hardware component, such as an Ethernet LAN adapter, or any other suitable network interface device, or a combination thereof.

Camera 210A and microphone 210B are designed to capture participant video and audio signals, respectively, for transmission to other conferencing participants. Conversely, video display 250C and speaker 250D are designed to display and play back video and audio signals received from other participants, respectively. Video display 250C may also be configured to optionally display participant/terminal 140's own video. Camera 210A and microphone 210B outputs are coupled to video and audio encoders 210G and 210H via analog-to-digital converters 210E and 210F, respectively. Video and audio encoders 210G and 210H are designed to compress input video and audio digital signals in order to reduce the bandwidths necessary for transmission of the signals over the electronic communications network. The input video signal may be live, or pre-recorded and stored video signals. The encoders compress the local digital signals in order to minimize the bandwidth necessary for transmission of the signals.

In an exemplary embodiment of the present invention, the audio signal may be encoded using any suitable technique known in the art (e.g., G.711, G.729, G.729EV, MPEG-1, etc.). In a preferred embodiment of the present invention, the scalable audio codec G.729EV is employed by audio encoder 210G to encode audio signals. The output of audio encoder 210G is sent to multiplexer MUX 220A for transmission over network 100 via NIC 230.

Packet MUX 220A may perform traditional multiplexing using the RTP protocol. Packet MUX 220A may also perform any related Quality of Service (QoS) processing that may be offered by network 100. Each stream of data from terminal 140 is transmitted in its own virtual channel or "port number" in IP terminology.

FIG. 3 shows the end-user terminal 140, which is configured for use with videoconferencing systems in which scalable or simulcast video coding is used. In this case, video encoder 210G has multiple outputs. FIG. 3 shows, for example, two layer outputs, which are labeled as "base" and "enhancement". The outputs of terminal 140 (i.e., the single layer output (FIG. 2) or the multiple layer outputs (FIG. 3)) are connected to Packet MUX 220A via an LRP processing module 270A. LRP processing module 270A (and modules 270B) are designed for error resilient communications ("error resilience LRP operation") by processing transmissions of special types of frames (e.g. "R" frames, FIGS. 12 and 13) as well as any other information that requires reliable transmission such as video sequence header data. If video encoder 210G produces more than one enhancement layer output, then each may be connected to LRP processing module 270A in the same manner as shown in FIG. 3. Similarly, in this case, the additional enhancement layers will be provided to video decoders 230A via LRP processing modules 270B. Alternatively, one or more of the enhancement layer outputs may be directly connected to Packet MUX 220A, and not via LRP processing module 270A.

Terminal 140 also may be configured with a set of video and audio decoder pairs 230A and 230B, with one pair for each participant that is seen or heard at terminal 140 in a videoconference. It will be understood that although several instances of decoders 230A and 230B are shown in FIGS. 2 and 3, it is possible to use a single pair of decoders 230A and 230B to sequentially process signals from multiple participants. Thus, terminal 140 may be configured with a single pair or a fewer number of pairs of decoders 230A and 230B than the number of participants.

The outputs of audio decoders 230B are connected to an audio mixer 240, which in turn is connected with a digital-to-analog converter (DA/C) 250A, which drives speaker 250B. The audio mixer combines the individual signals into a single output signal for playback. If the audio signals arrive pre-mixed, then audio mixer 240 may not be required. Similarly, the outputs of video decoders 230A may be combined in the frame buffer 250B of video display 250C via compositor 260. Compositor 260 is designed to position each decoded picture at an appropriate area of the output picture display. For example, if the display is split into four smaller areas, then compositor 260 obtains pixel data from each of video decoders 230A and places it in the appropriate frame buffer position (e.g., by filling up the lower right picture). To avoid double buffering (e.g., once at the output of decoder 230A and once at frame buffer 250B), compositor 260 may be implemented as an address generator that drives the placement of the output pixels of decoder 230A. Other techniques for optimizing the placement of the individual video outputs to display 250C can also be used to similar effect.

For example, in the H.264 standard specification, it is possible to combine views of multiple participants in a single coded picture by using a flexible macroblock ordering (FMO) scheme. In this scheme, each participant occupies a portion of the coded image, comprising one of its slices. Conceptually, a single decoder can be used to decode all participant signals. However, from a practical view, the receiver/terminal will have to decode four smaller independently coded slices. Thus, terminal 140 shown in FIG. 2 and FIG. 3 with decoders 230A may be used in applications of the H.264 specification. It is noted that the server for forwarding slices is an CSVCS.

In terminal 140, demultiplexer DMUX 220B receives packets from NIC 320 and redirects them to the appropriate decoder unit 230A via receiving LRP modules 270B as shown in FIGS. 2 and 3. LRP modules 270B at the inputs of video decoders 230A terminate the error resilience LRP at the receiving terminal end.

The MCU or SERVER CONTROL block 280 coordinates the interaction between the server (SVCS/CSVCS) and the end-user terminals. In a point-to-point communication system without intermediate servers, the SERVER CONTROL block is not needed. Similarly, in non-conferencing applications, only a single decoder is needed at a receiving end-user terminal. For applications involving stored video (e.g., broadcast of pre-recorded, pre-coded material), the transmitting end-user terminal may not involve the entire functionality of the audio and video encoding blocks or of all the terminal blocks preceding them (e.g., camera, microphone, etc.). Specifically, only the portions related to selective transmission of video packets, as explained below, need to be provided.

It will be understood that the various components of terminal 140 may be physically separate software and hardware devices or units that are interconnected to each other (e.g., integrated in a personal computer), or may be any combination thereof.

Figure 4:
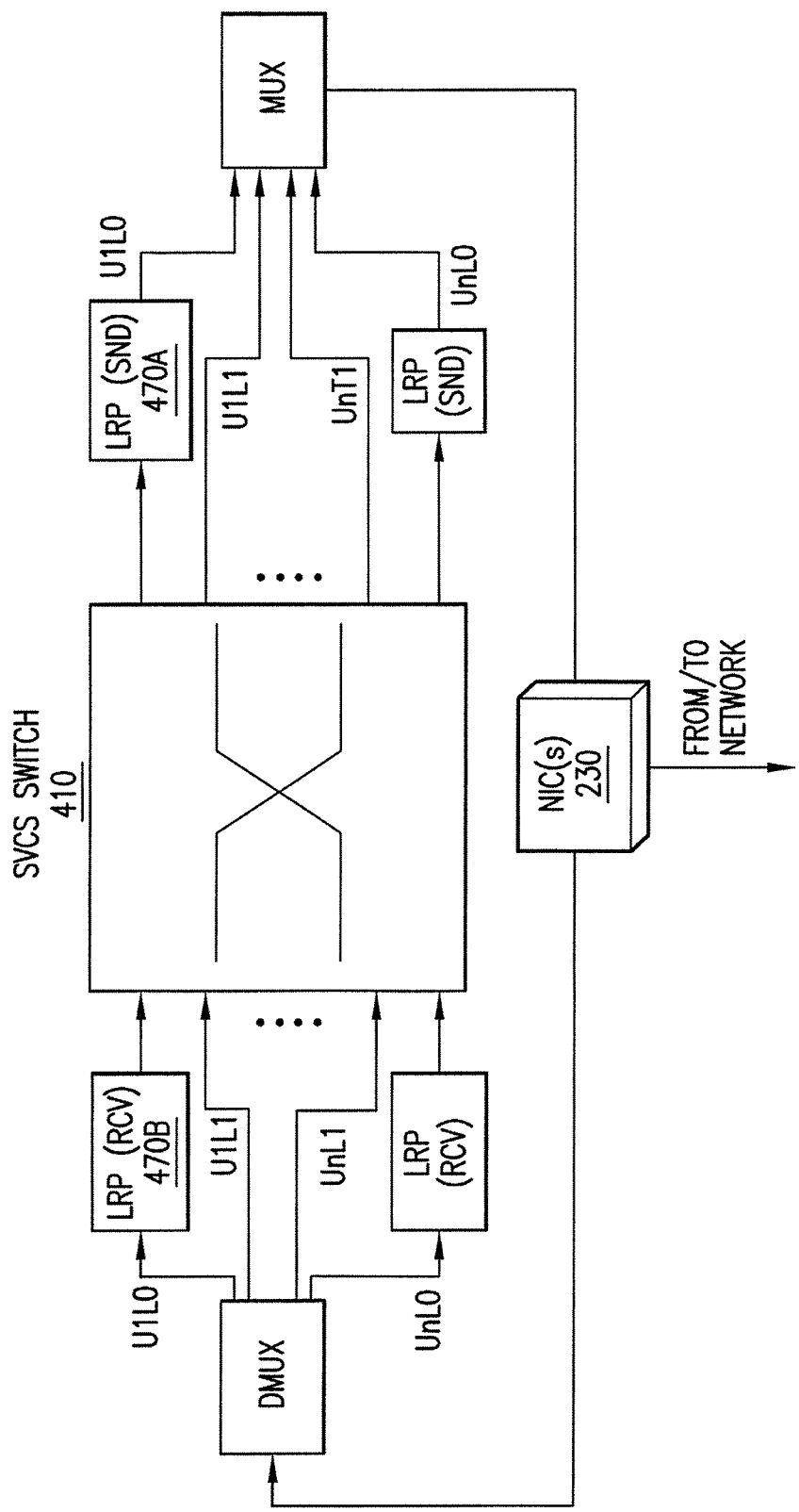
FIG. 4 is a block diagram illustrating the internal switching structure of a multipoint SVCS, in accordance with the principles of the present invention.

FIG. 4 shows the structure of an exemplary SVCS 400 for use in error resilient processing applications. The core of the SVCS 400 is a switch 410 that determines which packet from each of the possible sources is transmitted to which destination and over what channel. (See e.g., PCT/US06/028366).

Figure 5:
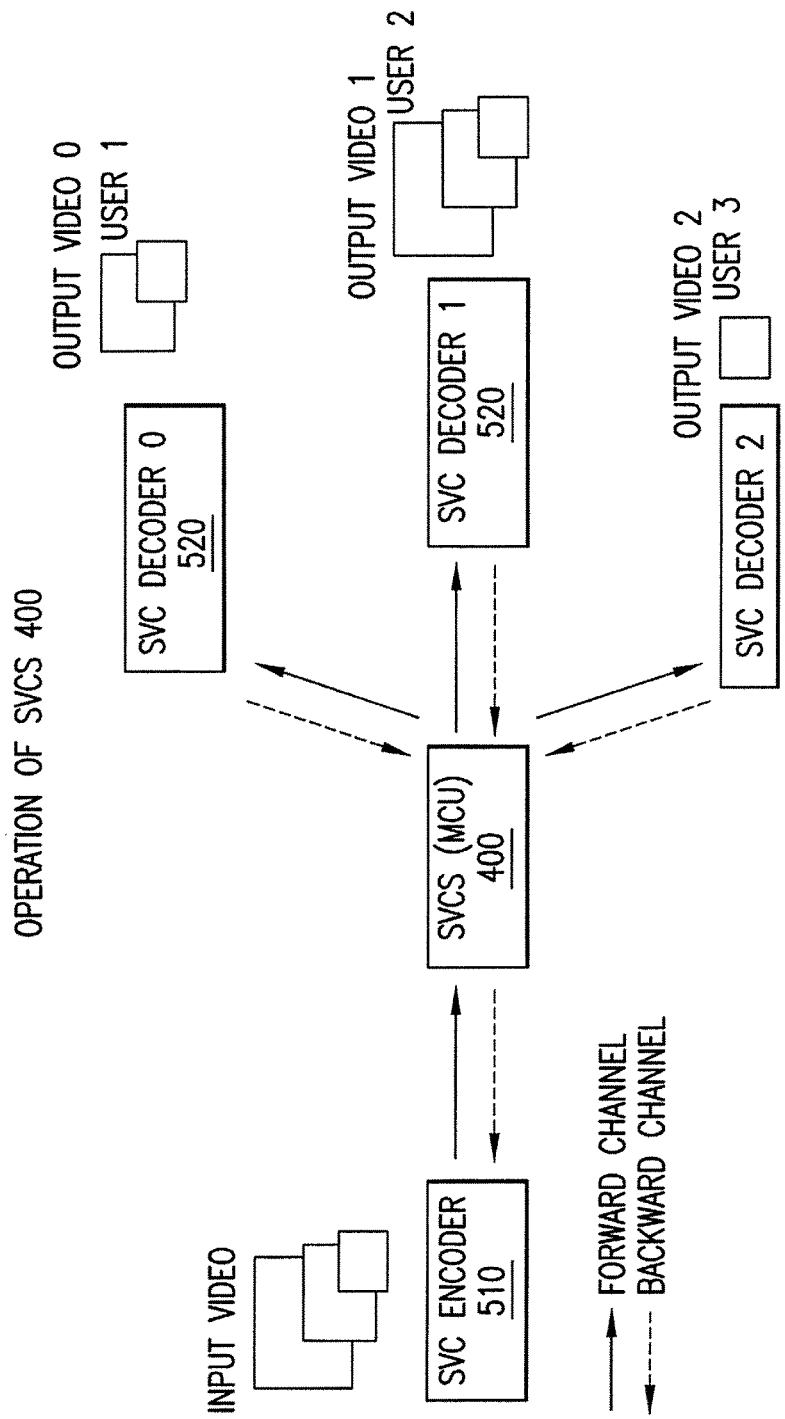
FIG. 5 is a block diagram illustrating the principles of operation of an SVCS.

The principles of operation of an exemplary SVCS 400 can be understood with reference to FIG. 5. A SVC Encoder 510 at a transmitting terminal or endpoint in this example produces three spatial layers in addition to a number of temporal layers (not shown pictorially). The individual coded video layers are transmitted from the transmitting endpoint (SVC Encoder) to SVCS 400 in individual packets. SVCS 400 decides which packets to forward to each of the three recipient/decoders 520 shown, depending on network conditions or user preferences. In the example shown in FIG. 5, SVCS 400 forwards only the first and second spatial layers to SVC Decoder 520(0), all three spatial layers to SVC Decoder 520(1), and only the first (base) layer to SVC Decoder 520(2).

With renewed reference to FIG. 4, in addition to the switch, which is described in PCT/US06/028366, SVCS 400 includes LRP units 470A and 470B, which are disposed at the switch inputs and outputs, respectively. SVCS 400 is configured to terminate error resilience LRP processing at its incoming switch connection, and to initiate error resilience LRP processing at its outgoing switch connections. In implementations of the invention using SVCS 400, error resilience LRP processing is not performed end-to-end over the network, but only over each individual connection segment (e.g., sender-to-SVCS, SVCS-to-SVCS, and SVCS-to-recipient). It will, however, be understood that the inventive error resilience LRP processing may be executed in an end-to-end fashion over the network, with or without the use an SVCS. An SVCS 400 without LRP units 470A and 470B can be used for end-to-end LRP processing in networks in which an SVCS is used. Further, SVCS 400 may be equipped with more than one NIC 230, as would typically be the case if SVCS 400 connects users across different networks.

Figure 6:
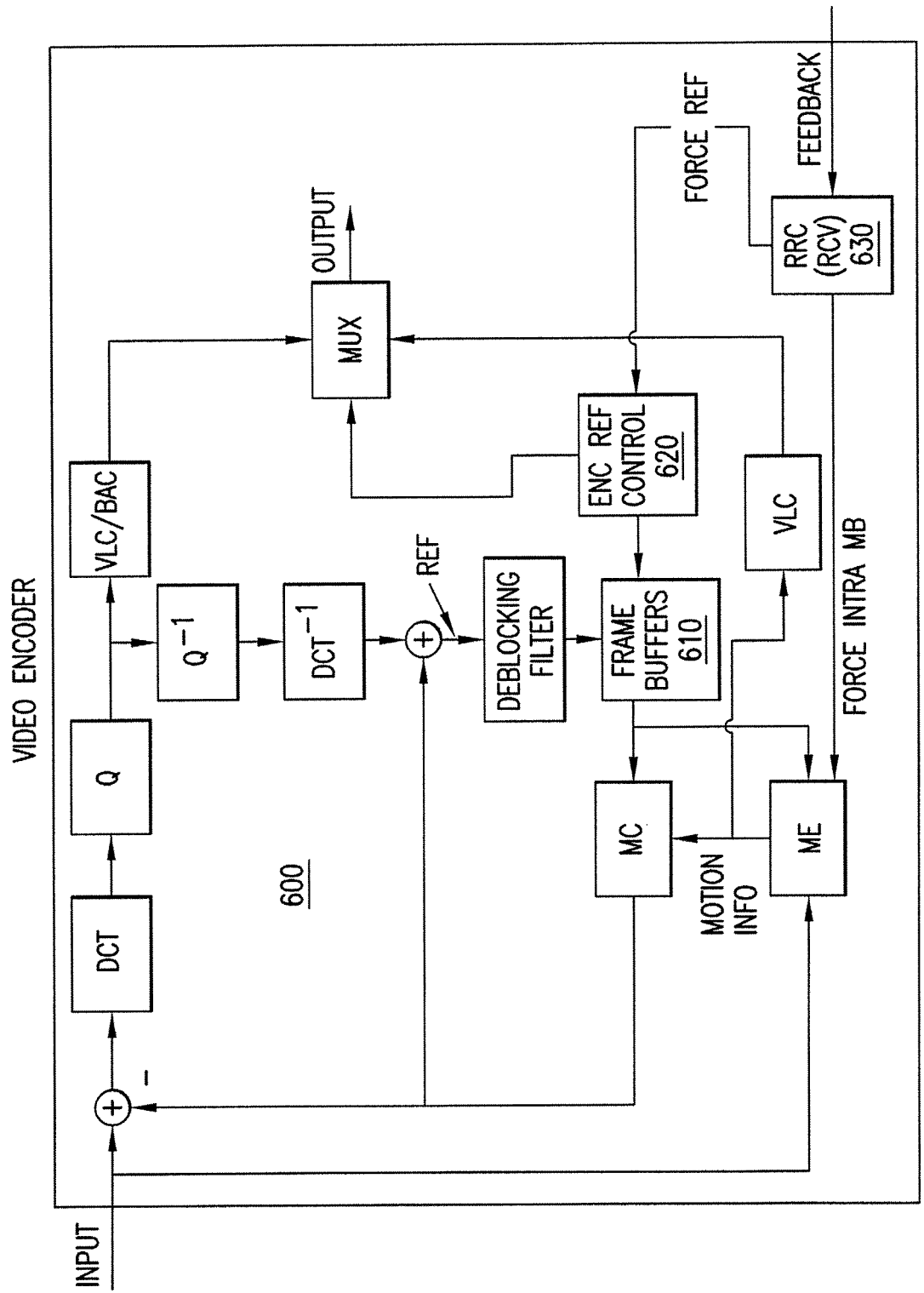
FIG. 6 is a block diagram illustrating the structure of an exemplary video encoder, in accordance with the principles of the present invention.
Figure 7:
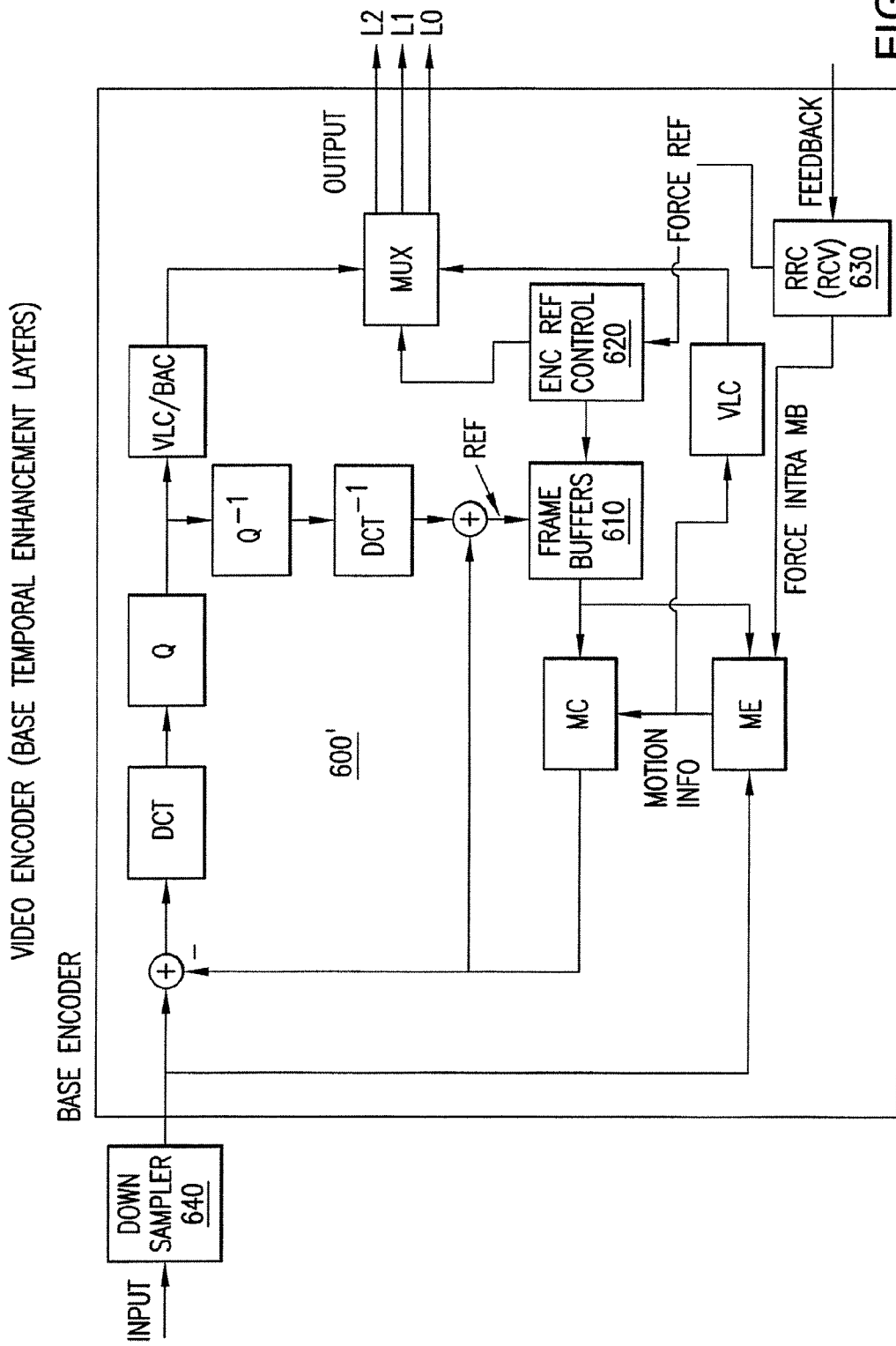
FIG. 7 is a block diagram illustrating an exemplary architecture of a video encoder for encoding base and temporal enhancement layers, in accordance with the principles of the present invention.
Figure 8:
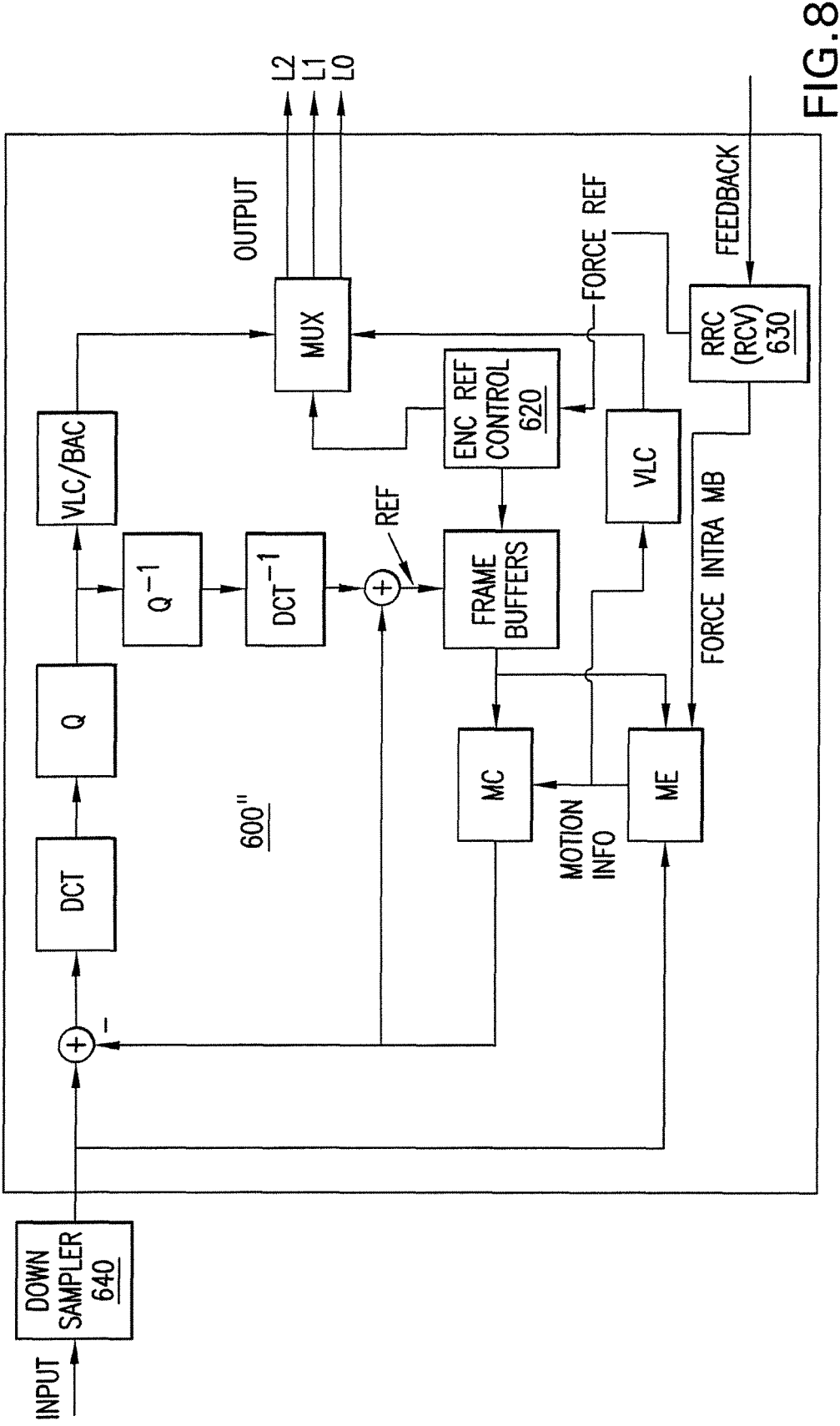
FIG. 8 is a block diagram illustrating an exemplary architecture of a video encoder for a spatial enhancement layer, in accordance with the principles of the present invention.

FIG. 6 shows the architecture of an exemplary video encoder 600 that may be used for in error resilient video communication systems. Video encoder 600 may, for example, be a motion-compensated, block-based transform coder. An H.264 design is a preferred design for video encoder 600. However, other codec designs may be used. For example, FIG. 7 shows the architecture of an exemplary video encoder 600' for encoding base and temporal enhancement layers based on SVC designs, whereas FIG. 8 shows the architecture of an exemplary video encoder 600" for encoding spatial enhancement layers. (See e.g., PCT/US06/28365 and PCT/US06/028366). Video encoder 600' and 600" include an optional input downsampler 640, which can be utilized to reduce the input resolution (e.g., from CIF to CIF) in systems using spatial scalability.

FIG. 6 also shows a coding process, which may be implemented using video encoder 600. ENC REF CONTROL 620 in encoder 600 is used to create a "threaded" coding structure. (See e.g., PCT/US06/28365 and PCT/US06/028366). Standard block-based motion compensated codecs have a regular structure of I, P, and B frames. For example, in a picture sequence (in display order) such as IBBPBBP, the 'P' frames are predicted from the previous P or I frame, whereas the B pictures are predicted using both the previous and next P or I frame. Although the number of B pictures between successive I or P pictures can vary, as can the rate in which I pictures appear, it is not possible, for example, for a P picture to use as a reference for prediction another P picture that is earlier in time than the most recent one. H.264 is an exception in that the encoder and decoder maintain two reference picture lists. It is possible to select which pictures are used for references and also which references are used for a particular picture that is to be coded. The FRAME BUFFERS block 610 in FIG. 6 represents the memory that stores the reference picture list(s), whereas ENC REF CONTROL 620 determines—at the encoder side—which reference picture is to be used for the current picture.

Figure 9:
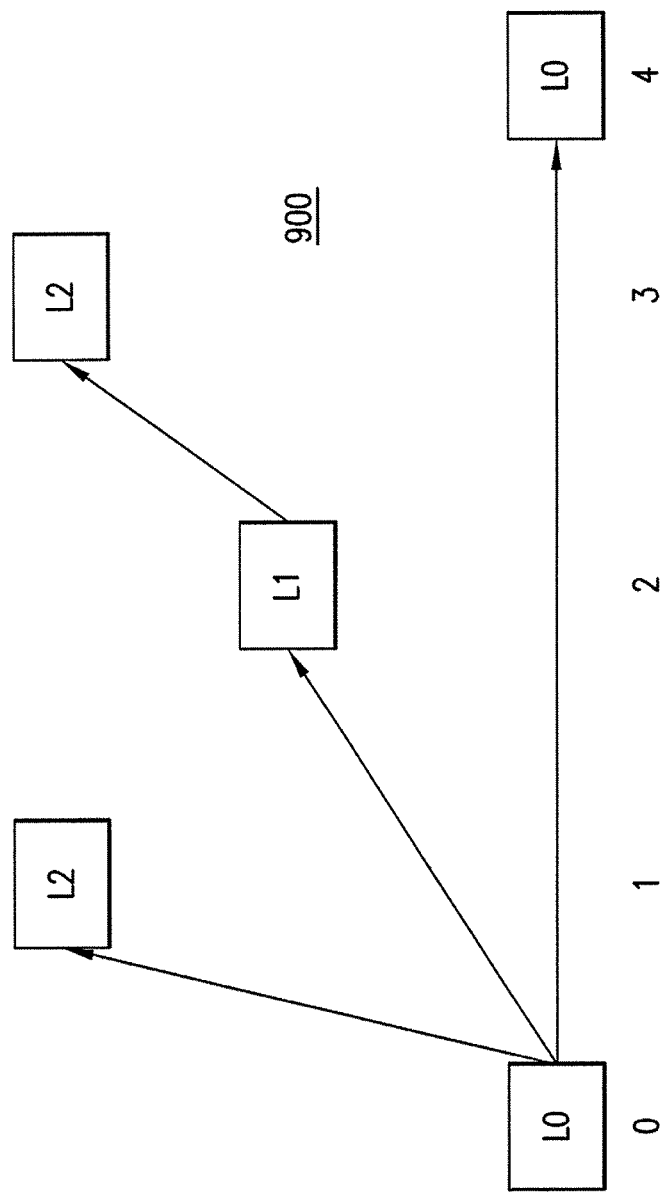
FIG. 9 is a block diagram illustrating an exemplary layered picture coding structure, in accordance with the principles of the present invention.
Figure 10:
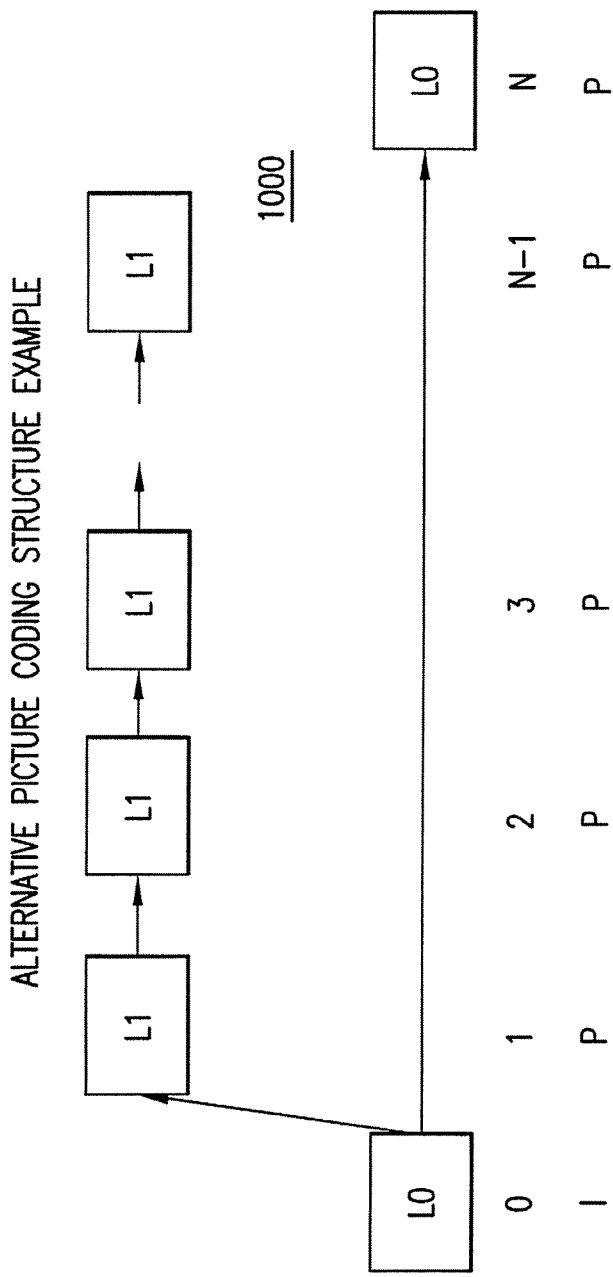
FIG. 10 is a block diagram illustrating another exemplary layered picture coding structure, in accordance with the principles of the present invention.

The operation of ENC REF CONTROL 520 can be better understood with reference to FIG. 9, which shows an exemplary layered picture coding structure 900. In order to enable multiple temporal resolutions, the codec used in the video communications system may generate a number of separate picture "threads." A thread at a given level is defined as a sequence of pictures that are motion compensated using pictures either from the same thread, or pictures from a lower level thread. The use of threads allows the implementation of temporal scalability, since one can eliminate any number of top-level threads without affecting the decoding process of the remaining threads.

In a preferred embodiment of the present invention, a coding structure with a set of three threads is used (e.g., structure 900, FIG. 9). In FIG. 9, the letter 'L' in the picture labels indicates an arbitrary scalability layer. The numbers (0, 1 and 2) following L identify the temporal layer, for example, with "0" corresponding to the lowest, or coarsest temporal layer and "2" corresponding the highest or finest temporal layer. The arrows shown in FIG. 9 indicate the direction, source, and target of prediction. In most applications only P pictures will be used, as the use of B pictures increases the coding delay by the time it takes to capture and encode the reference pictures used for the B pictures. However, in applications that are not delay sensitive, some or all of the pictures could be B pictures with the possible exception of L0 pictures. Similarly, the L0 pictures may be I pictures forming a traditional group of pictures (GOP).

With continued reference to FIG. 9, layer L0 is simply a series of regular P pictures spaced four pictures apart. Layer L1 has the same frame rate as L0, but prediction is only allowed from the previous L0 frame. Layer L2 frames are predicted from the most recent L0 or L1 frame. L0 provides one fourth (1:4) of the full temporal resolution, L1 doubles the L0 frame rate (1:2), and L2 doubles the L0+L1 frame rate (1:1).

Figure 11:
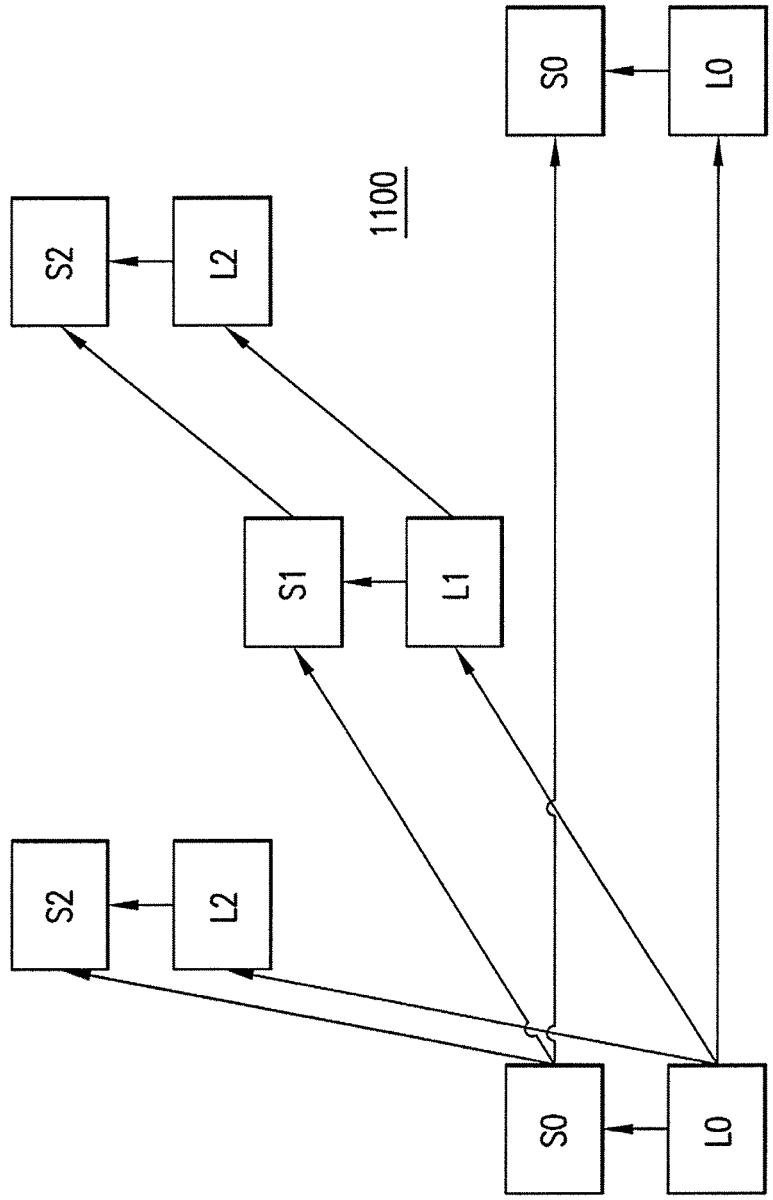
FIG. 11 is a block diagram illustrating an exemplary picture coding structure including temporal and spatial scalability, in accordance with the principles of the present invention.

More or fewer layers than the three L0, L1 and L2 layers discussed above may be similarly constructed in coding structures designed to accommodate the different bandwidth/scalability requirements of specific implementations of the present invention. FIG. 11: shows an example of a threaded coding structure 1000 with only two layers L0 and L1. Further, FIG. 11 shows an example of a threaded coding structure 1100 for spatial scalability. Coding structure 1100 includes threads for enhancement layers, which are denoted by the letter 'S'. It will be noted that the enhancement layer frames may have a different threading structure than the base layer frames.

Video encoder 600' (FIG. 7) for encoding temporal layers may be augmented to encode spatial and/or quality enhancement layers. (See e.g., PCT/US06/028365 and PCT/US06/028366). FIG. 8 shows an exemplary encoder 600" for the spatial enhancement layer. The structure and functions of encoder 600" are similar to that of the base layer codec 600', except in that base layer information is also available to the encoder 600". This information may consist of motion vector data, macroblock mode data, coded prediction error data, or reconstructed pixel data. Encoder 600" can re-use some or all of this data in order to make coding decisions for the enhancement layers S. The data has to be scaled to the target resolution of the enhancement layer (e.g., by factor of 2 if the base layer is QCIF and the enhancement layer is CIF). Although spatial scalability typically requires two coding loops to be maintained, it is possible, for example, under the H.264 Annex G (SVC) draft standard, to perform single-loop decoding by limiting the data of the base layer that is used for enhancement layer coding to only values that are computable from the information encoded in the current picture's base layer. (See e.g., T. Wiegand, G. Sullivan, J. Reichel, H. Schwarz, M. Wien, eds., "Joint Draft 8 of SVC Amendment," Joint Video Team, Doc. JVT-U201, Hangzhou, October 2006, incorporated herein by reference in its entirety). For example, if a base layer macroblock is inter-coded, then the enhancement layer cannot use the reconstructed pixels of that macroblock as a basis for prediction. It can, however, use its motion vectors and the prediction error values since they are obtainable by just decoding the information contained in the current base layer picture. Single-loop decoding is desirable since the complexity of the decoder is significantly decreased.

Quality or SNR scalability enhancement layer codecs may be constructed in the manner as spatial scalability codecs. For quality scalability, instead of building the enhancement layer on a higher resolution version of the input, the codecs code the residual prediction error at the same spatial resolution. As with spatial scalability, all the macroblock data of the base layer can be re-used at the enhancement layer, in either single- or dual-loop coding configurations. For brevity, the description herein is generally directed to techniques using spatial scalability. It will, however, be understood that the same techniques are applicable to quality scalability.

International patent application PCT/US06/028365 describes the distinct advantages that threading coding structures (e.g., coding structure 900) have in terms of their robustness to the presence of transmission errors. In traditional state-of-the-art video codecs based on motion-compensated prediction, temporal dependency is inherent. Any packet losses at a given picture not only affects the quality of that particular picture, but also affects all future pictures for which the given picture acts as a reference, either directly or indirectly. This is because the reference frame that the decoder can construct for future predictions will not be the same as the one used at the encoder. The ensuing difference, or drift, can have tremendous impact on the visual quality produced by traditional state-of-the-art video codecs.

In contrast, the threading structure shown in FIG. 9 creates three self-contained threads or chains of dependencies. A packet loss occurring for an L2 picture will only affect L2 pictures; the L0 and L1 pictures can still be decoded and displayed. Similarly, a packet loss occurring at an L1 picture will only affect L1 and L2 pictures; the L0 pictures can still be decoded and displayed. Further, threading structures may be created to include threads or chains of dependencies for S pictures (e.g., FIG. 11). The exemplary S packets threading structure 1100 shown in FIG. 11 has similar properties as the L picture threading structure 900 shown in FIG. 9. A loss occurring at an S2 picture only affects the particular picture, whereas a loss at an S1 picture will also affect the following S2 picture. In either case, drift will terminate upon decoding of the next S0 picture.

With renewed reference to FIG. 9, a packet loss occurring at an L0 picture can be catastrophic in terms of picture quality, since all picture types will be affected. As previously noted, a traditional solution to this problem is to periodically code L0 pictures as intra or I pictures. However, the bandwidth overhead for implementing this solution can be considerable as the I pictures are typically 3-6 times larger than P pictures. Furthermore, the packet loss, which gives rise to the need to use an I picture, is often the result of network congestion. Attempting to send an I picture over the network to remedy the packet loss only exacerbates the congestion problem.

If the base layer L0 and some enhancement layer pictures are transmitted in a way that guarantees their delivery, the remaining layers can be transmitted on a best-effort basis without catastrophic results in the case of a packet loss. Such guaranteed transmissions can be performed using known techniques such as DiffServ, and FEC, etc. In the description herein, reference also may be made to a High Reliability Channel (HRC) and Low Reliability Channel (LRC) as the two actual or virtual channels that offer such differentiated quality of service (FIG. 1). (See e.g., PCT/US06/028365 and PCT/US06/028366). In video communication systems which use scalable video coded structures (e.g., structure 1100, FIG. 11), layers L0-L2 and S0 may, for example, be reliably transmitted on the HRC, while S1 and S2 are transmitted on the LRC. Although the loss of an S1 or S2 packet would cause limited drift, it is still desirable to be able to conceal as much of the loss of information as possible.

The error resilience techniques described in International patent application No. PCT/US06/061815 overcome the limitations of traditional techniques for compensating for packet loss by utilizing reliable transmission of a subset of the L0 layer or the entire L0 layer. Error resilience or reliability is ensured by retransmissions. These error resilience techniques are designed not merely to recover a lost picture for display purposes, but are designed to create the correct reference picture for the decoding of future pictures that depend on the one that was contained (in whole or in part) in a lost packet. The present invention improves on these techniques by ensuring their proper operation in the case where pictures are transmitted over multiple transport layer (e.g., RTP) packets. In system implementations of the present invention, the reliable transmission of the L0 pictures may be performed by LRP modules (e.g., FIG. 2, modules 270A and 270B, and FIG. 4, modules 470A and 470B) using positive or negative acknowledgments between the sending and receiving counterparts according to a suitable protection protocol.

Figure 12:
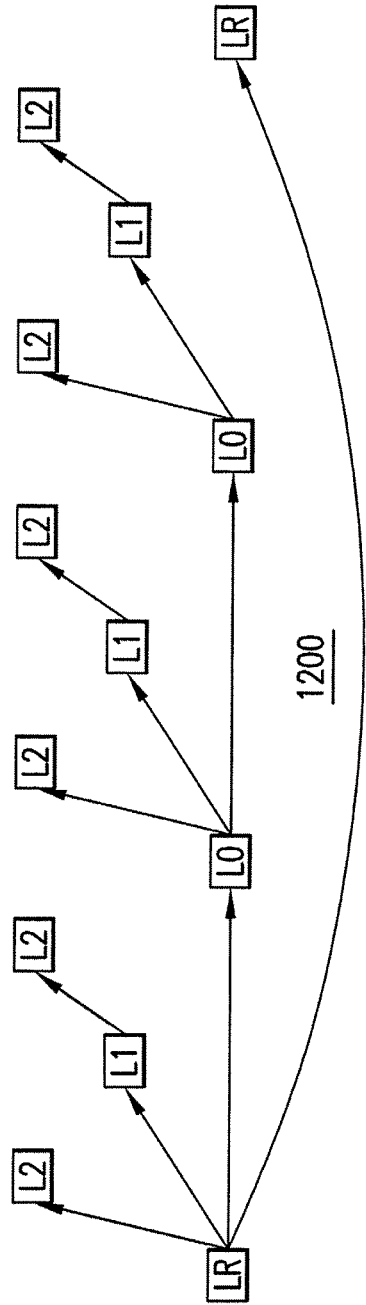
FIG. 12 is a block diagram illustrating an exemplary layered picture coding structure used for error resilient video communications, in accordance with the principles of the present invention.

FIG. 12 shows an exemplary picture coding structure 1200 (which is also described in International patent application No. PCT/US06/061815) in which the L0 base and L1-L2 temporal enhancement layers are coupled with at least one reliably transmitted base layer picture for error resilient video communications. In coding structure 1200, in addition to conventional base and enhancement picture types that are labeled as L0-L2 pictures, there is a new picture type called LR ('R' for reliable). It is noted that in coding structure 1200 shown in FIG. 12, the layers LR and L0-L2 can equivalently have been labeled as L0-L3, respectively, since the LR pictures always are the lowest temporal layer of the coded video signal. In accordance with the present invention for error resilient video communications, the LR pictures, which may be P pictures, are designated to be reliably delivered to receiver destinations.

The operation of the inventive error resilient techniques can be understood by consideration of an example in which one of the L0 pictures is damaged or lost due to packet loss. As previously noted, in traditional communication systems the effect of loss of the L0 picture is severe on all subsequent L0-L2 pictures. With the picture coding structure 1200, the next "reliably-delivered" LR picture after a lost L0 picture offers a resynchronization point, after which point the receiver/decoder can continue decoding and display without distortion.

In the coding structure 1200 shown in FIG. 12, the temporal distance between the LR pictures is, for example, 12 frames. The reliable delivery of the LR pictures exploits the fact that P pictures with very long temporal distances (6 frames or more) are about half the size of an I picture, and that the reliable delivery is not intended to ensure timely display of the relevant picture, but instead is intended for creation of a suitable reference picture for future use. As a result the delivery of an LR picture can be accomplished by a very slight bandwidth increase in the system during the period between successive LR pictures.

Coding structure 1200 may be implemented using the existing H.264 standard under which the LR pictures may, for example, be stored at a decoder as long-term reference pictures and be replaced using MMCO commands.

Figure 13:
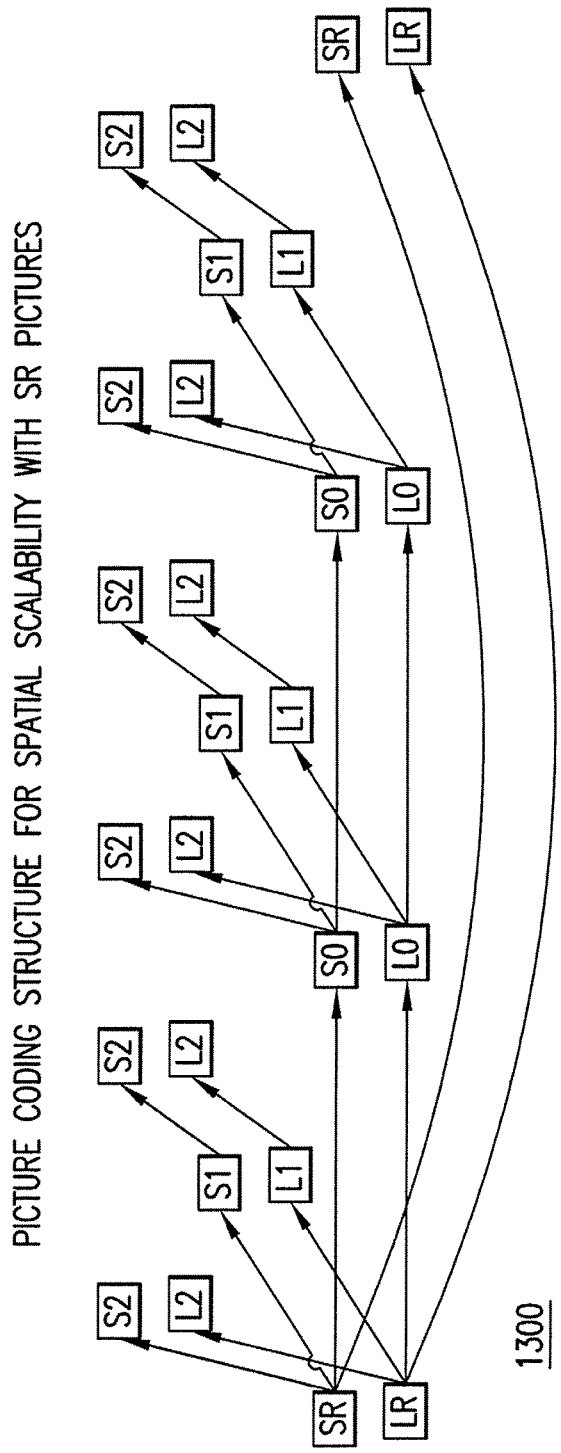
FIG. 13 is a block diagram illustrating an exemplary picture coding structure used for error resilient video communications with spatial/quality scalability, in accordance with the principles of the present invention.

FIG. 13 shows an exemplary picture coding structure 1300 where the LR picture concept is applied to enhancement layer pictures (either spatial or quality scalability). Here, the pictures to be reliably transmitted are labeled SR, and as with LR pictures, they constitute the lowest temporal layer of the spatial or quality enhancement layer.

It is noted that although the LR pictures concept is generally described herein for purposes of illustration, as applied to the lowest temporal layer of the coded video signal, the concept can also be extended and applied to additional layers in accordance with the principles of the present invention. This extended application will result in additional pictures being transported in a reliable fashion. For example, with reference to FIG. 12 in addition to the LR pictures, the L0 pictures could also be included in the reliable (re)transmission mechanism. Similarly, pictures of any spatial/quality enhancement layers (from the lowest or additional temporal layers) may be included. Further, video sequence header or other data may be treated or considered to be equivalent to LR pictures in the system so that they (header or other data) are reliably transmitted. In the following, for simplicity in description we assume that only LR pictures are reliably transmitted, unless explicitly specified otherwise. However, it will be readily understood that additional layers or data can be reliably transmitted in exactly the same way.

It is desirable that the bandwidth overhead for the reliable delivery of the LR frames is zero or negligible, when there are no packet losses. This implies that a dynamic, closed-loop algorithm should be used for the reliable delivery mechanism. It may also be possible to use open loop algorithms, where, for example, an LR frame is retransmitted proactively a number of times.

International patent application No. PCT/US06/061825 describes several mechanisms to notify a sender (e.g., SENDER, SVCS1, or SVCS2) that a particular LR picture has been received by an intended receiver, and also techniques for dynamically establishing LR pictures. Using RTCP or other feedback mechanisms, the sender can be notified that a particular receiver is experiencing lost packets using, for example, the positive and negative acknowledgment techniques described therein. The feedback can be as detailed as individual ACK/NACK messages for each individual packet. Use of feedback enables the encoder to calculate (exactly or approximately) the state of the decoder(s), and act accordingly. This feedback is generated and collected by Reliability and Random access Control (RRC) modules 530 (FIG. 6).

An important aspect of these sender-notification mechanisms is the technique by which a receiver (receiving endpoint or SVCS) detects the loss of an LR picture with minimal delay. The technique used in the aforementioned patent application relies on LR picture numbers and picture number references.

The LR picture numbers technique operates by assigning sequential numbers to LR pictures, which are carried together with the LR picture packets. The receiver maintains a list of the numbers of the LR pictures it has received. Non-LR pictures, on the other hand, contain the sequence number of the most recent LR picture in decoding order. This sequence number reference allows a receiver to detect a lost LR picture even before receipt of the following LR picture. When a receiver receives an LR picture, it can detect if it has lost (i.e. not received) one or more of the previous LR pictures by comparing the picture number of the received LR picture with the list of picture numbers it maintains. The picture number of the received LR picture should be one more than that of the previous one, or 0 if the count has restarted. When a receiver receives a non-LR picture, it tests to see if the referenced LR picture number is present in its number list. If it is not, the referenced LR picture is assumed to be lost and corrective action may be initiated (e.g., a NACK message is transmitted back to the sender). It is noted that detection of lost LR pictures using the LR picture number technique can be performed both at a receiving endpoint as well as an intermediate SVCS. The operation is performed, e.g., at the LRP (Rcv) module 270B in FIG. 2 and FIG. 3, or 470B in FIG. 4.

A potential limitation of the picture numbers technique can manifest itself when a single LR picture is transported using more than one packet. Such transport may occur, for example, if encoding is done using multiple slices, but can occur whenever the coded bits of a given picture exceed the maximum transport layer packet size. When multiple packets are used to transport a picture, all the packets will have the same picture index value since they belong to the same picture. If all such packets are lost in transit, then the receiver can properly detect the loss upon the next successful reception of picture data. If, however, in the case of partial data reception in which only some of the picture's packets are lost (but a few of the packets are received) a receiver will not be able to detect the loss, unless it examines the data to determine if all macroblocks contained in the picture are included in the received data. This determination, which requires that the receiver parse coded video data, is a computationally demanding task. In the H.264 or H.264 SVC cases, for example, determining if a set of slices includes data for an entire packet requires parsing of the entire slice header. The parsing operation can be performed in a receiver that is equipped with a decoder. However, such is not the case when the receiver is an SVCS or any other type of MANE.

To address error resilience in the case of partial data reception, it is noted that a receiver can detect packet losses using the sequence number associated with every packet (e.g., RTP sequence numbers in a preferred embodiment where RTP is used as the transport protocol). Successive packets of an LR picture will contain successive RTP sequence numbers. If partial data is received, a receiver knows from the gap in the received RTP sequence numbers that some data was lost, but it cannot determine if the lost data correspond to portion of the LR picture or data from a following picture. As a result, from the RTP sequence numbers alone, it is not possible to detect if the received data contains the entire LR picture. To enable a receiver to detect receipt of the entire picture, the present invention introduces two flags, a start bit flag and an end bit flag, that respectively indicate the first and last packets containing data of an LR picture.

Upon reception of packet of an LR picture, a receiver can examine its RTP sequence number and check if it has received all previous packets with successively smaller RTP sequence numbers until reaching a packet that has the same picture index value and in which the 'start' bit is set. Similarly, it can continue checking that successive packets with successively larger RTP sequence numbers are received, until reaching a packet that has the same picture index value and in which the 'last' bit set. With this modification, frame indices can be used to detect losses of lowest temporal level pictures in both cases when no data is received and when partial data is received.

The two flags also may be introduced in temporal levels higher than the lowest temporal level to enable integrity detection for pictures belonging to higher temporal levels. This—coupled with RTP sequence numbers—would allow a receiver to quickly determine if it has received all needed data for a particular picture, regardless of its temporal level.

It is noted that RTP marker bit has a usual definition for use in video transport as "the last packet of a picture." Use of the RTP marker bit may be considered in lieu of the 'last' flag. However, in the context of SVC, such use of the RTP marker bit is not sufficient to solve the problem this invention addresses, since a picture may include several 'pictures' (base and enhancement layers). Furthermore, such a change would create problems in existing RTP systems that already incorporate the usual interpretation of the RTP marker bit.

Two different embodiments of the modified LR picture numbering technique are described herein. One embodiment (hereinafter referred to as the 'R packets' technique) is appropriate when the RTP protocol is used by the system for transmission. The other embodiment is applicable when the H.264 SVC draft standard is used for the system.

For the R packets technique, assume that the RTP protocol (over UDP and IP) is used for communication between two terminals, possibly through one or more intermediate servers. Note that the media transmitting terminal may perform real-time encoding, or may access media data from local or other storage (RAM, hard disk, a storage area network, a file server, etc.). Similarly, the receiving terminal may perform real-time decoding, and it may be storing the received data in local or other storage for future playback, or both. For the description herein, it is assumed, without limitation, that real-time encoding and decoding are taking place.

Figure 14:
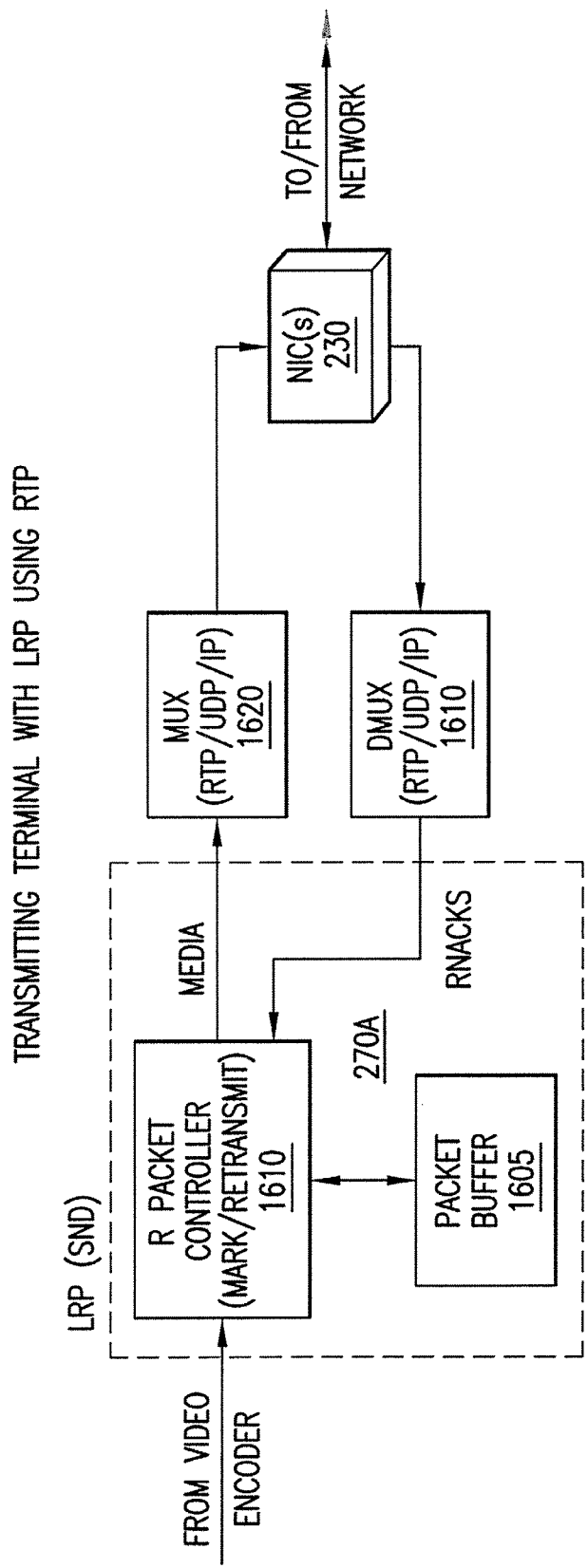
FIG. 14 is a block diagram illustrating an exemplary architecture of the transmitting terminal's LRP (Snd) module when the R-packets technique is used for transmission over RTP, in accordance with the principles of the present invention.

FIG. 14 shows the architecture of the transmitting terminal's LRP Snd module (e.g., module 270A, FIG. 2). LRP Snd module includes a packet processor (R-Packet Controller 1610) with local storage (e.g., buffer 1605) for packets that may require retransmission). R-Packet Controller 1610 marks the R packets and also responds to RNACKs. The R-Packet Controller is connected to a multiplexer MUX 1620 and a demultiplexer DMUX 1630 implementing the RTP/UDP/IP protocol stack. Although MUX 1620 and DMUX 1630 are shown in FIG. 14 as separate entities, they may be combined in the same unit. MUX 1620 and DMUX 1630 are connected to one or more network interface controllers (NICs) which provide the physical layer interface. In a preferred embodiment, the NIC is an Ethernet adapter, but any other NICs can be used as will be obvious to persons skilled in the art.

Figure 15:
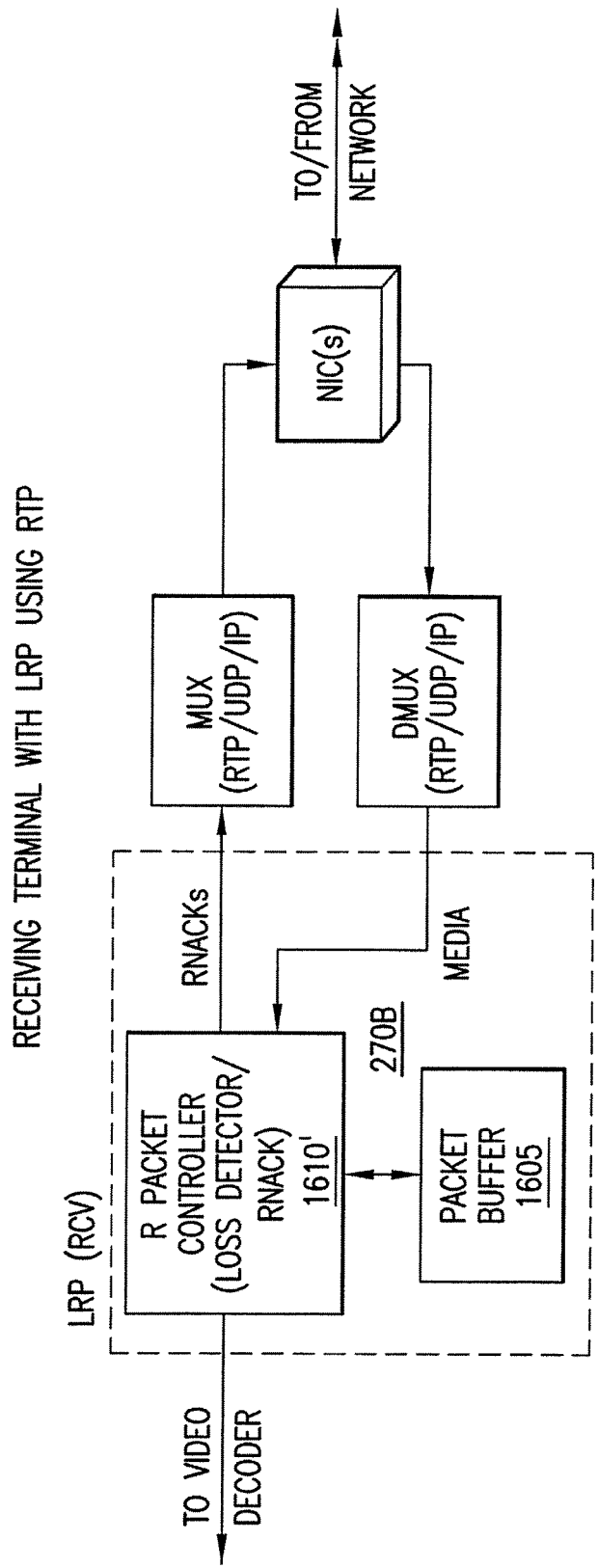
FIG. 15 is a block diagram illustrating an exemplary architecture of the receiving terminal's LRP (Rcv) module when the R-packets technique is used for transmission over RTP, in accordance with the principles of the present invention.
Figure 16:
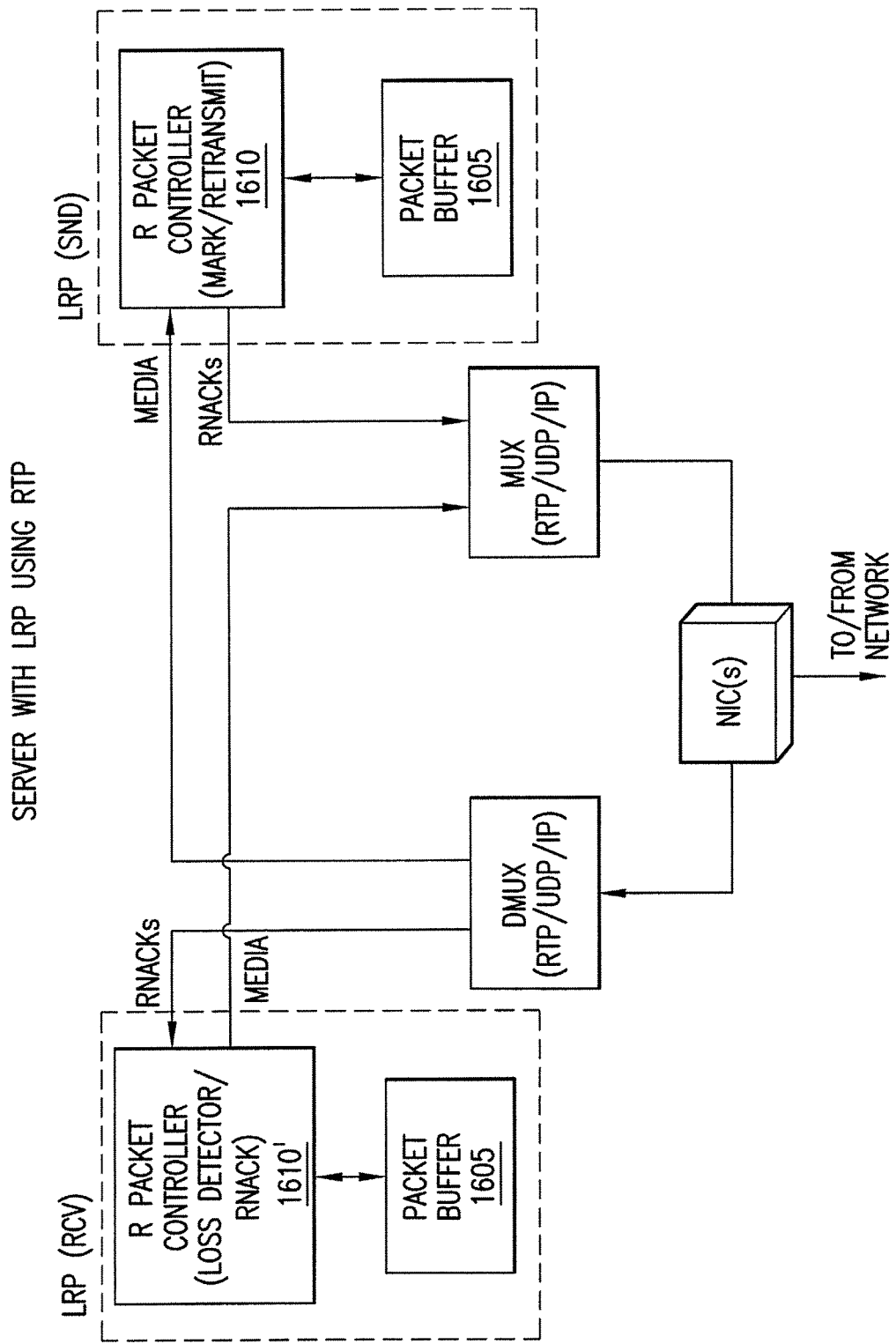
FIG. 16 is a block diagram illustrating an exemplary architecture of the server's LRP Snd and Rcv modules when the R-packets technique is used for transmission over RTP, in accordance with the principles of the present invention.

Similarly, FIG. 15 shows an exemplary architecture of the receiving terminal's LRP Rcv module (e.g., module 270B, FIG. 2). The R-Packet Controller here (e.g., controller 1610') is responsible for packet loss detection and generation of appropriate NACK messages. Further, FIG. 16 shows the structure of the server's LRP Snd and Rcv modules (e.g., modules 420A and 420B, FIG. 4), which may be the same as components of a receiving terminal and that of a transmitting terminal connected back-to-back.

In a preferred embodiment, the transmitting terminal packetizes media data according to the RTP specification. It is noted that that although different packetization (called "payload") formats are defined for RTP, they all share the same common header. This invention introduces a named header extension mechanism (see Singer, D., "A general mechanism for RTP Header Extensions," draft-ietf-avt-rtp-hdrext-01 (work in progress), February 2006) for RTP packets so that R packets can be properly handled.

According to the present invention, in an RTP session containing R packets, individual packets are marked with the named header extension mechanism. The R packet header extension element identifies both R packets themselves and previously-sent R packets. This header extension element has the name "com.layeredmedia.avt.r-packet/200606". Every R packet includes, and every non-R packet should include, a header extension element of this form.

FIG. 17 shows an exemplary data field format of the inventive named header extension, in which the fields are defined as follows.

ID: 4 bits
  The local identifier negotiated for this header extension
    element, as defined, for example, in Singer, D., "A general mechanism for RTP Header Extensions," draft-ietf-avt-rtp-hdrext-01 (work in progress), February 2006.
Length (len): 4 bits
  The length minus one of the data bytes of this header
    extension element, not counting the header byte (ID and len). This will have the value 6 if the second word (the superseded range) is present, and 2 if it is not. Thus, its value must either be 2 or 6.
R: 1 bit
  A bit indicating that the packet containing this header
    extension element is an R packet in series SER with R sequence number RSEQ. If this bit is not set, the header extension element instead indicates that the media stream's most recent R packet in series SER had R sequence number RSEQ. If this bit is not set, the superseded range should not be present (i.e. the len field should be 2) and must be ignored if present.

Reserved, Must Be Zero (0): 1 bit
Reserved bit. This must be set to zero on transmit and ignored on receive.

Start (S): 1 bit
This must be set to one if this is the first packet containing data from a given picture.

End (E): 1 bit
This must be set to one if this is the last packet containing data from a given picture.

Series ID (SER): 4 bits
An identifier of which series of R packets is being described by this header extension element. If a media encoder is describing only a single series of R packets, this should have the value 0. For example, using the scalable video picture coding structure depicted in FIG. 13, L packets (base spatial enhancement layer, all threads) would have SER set to, say, 0, and S packets (spatial enhancement layer, all threads) would have SER set to 1.

R Packet Sequence Number (RSEQ): 16 bits
An unsigned sequence number indicating the number of this R packet within the series SER. This value is incremented by 1 (modulo $2^{16}$) for every R packet sent in a given series. RSEQ values for separate sequences are independent.

Start of Superseded Range (SUPERSEDE_START): 16 bits
The R sequence number of the earliest R packet, inclusive, superseded by this R packet, calculated modulo $2^{16}$. (Since this value uses modulo arithmetic, the value RSEQ+1 may be used for SUPERSEDE_START to indicate that all R packets prior to the end of the superseded range have been superseded.) This field is optional, and is only present when len=6.

End of Superseded Range (SUPERSEDE_END): 16 bits
The R sequence number of the final R packet, inclusive, superseded by this R packet, calculated modulo $2^{16}$. This value must lie in the closed range [SUPERSEDE_START . . . RSEQ] modulo $2^{16}$. This field is optional, and is only present when len=6.

The operation of an error resilient video communication system in accordance with the present invention is the same or similar to the operation described in International patent application No. PCT/US06/61815, except from the use of the 'S' and 'E' flags. These flags are used at the receiver in combination with RTP sequence numbers to detect if an LR picture has been received in its entirety (in which case no corrective action is needed) or partially (in which case corrective action must be initiated). All other aspects of the system's operation including the various retransmission techniques (e.g., positive or negative acknowledgments) remain the same.

An RTP packet may contain multiple R packet mark elements, so long as each of these elements has a different value for SER. However, an RTP packet must not contain more than one of these header extension elements with the R bit set, i.e. an R packet may not belong to more than one series.

All RTP packets in a media stream using R packets should include a mark element for all active series.

When the second word of this header extension element is present, it indicates that this R packet supersedes some previously-received R packets, meaning that these packets are no longer necessary in order to reconstruct stream state. This second word must only appear in a header extension element which has its R bit set.

An R packet can only supersede R packets in the series identified by the element's SER field. R packets cannot supersede packets in other series.

It is valid for a superseded element to have SUPERSEDE_END=RSEQ. This indicates that the R packet supersedes itself, i.e., that this R packet immediately becomes irrelevant to the stream state. In practice, the most common reason to do this would be to end a series; this can be done by sending an empty packet (e.g. an RTP No-op packet, see Andreasen, F., "A No-Op Payload Format for RTP," draft-ietf-avt-rtp-no-op-00 (work in progress), May 2005.) with the superseded range (SUPERSEDE_START, SUPERSEDE_END)=(RSEQ+1, RSEQ), so that the series no longer contains any non-superseded packets.

The first R packet sent in a series should be sent with the superseded range (SUPERSEDE_START, SUPERSEDE_END)=(RSEQ+1, RSEQ-1), to make it clear that no other R packets are present in the range.

R packets may redundantly include already-superseded packets in the range of packets to be superseded.

The loss of R packets is detected by the receiver, and is indicated by the receiver to the sender using an RTCP feedback message. The R Packet Negative Acknowledgement (RNACK) Message is an RTCP Feedback message (see e.g., Ott, J. et al., "Extended RTP Profile for RTCP-based Feedback(RTP/AVPF)," RFC 4585, July 2006) identified, as an example, by PT=RTPFB and FMT=4. Other values can be chosen, in accordance with the present invention. The FCI field must contain at least one and may contain more than one RNACK.

The RNACK packet is used to indicate the loss of one or more R packets. The lost packet(s) are identified by means of a packet sequence number, the series identifier, and a bit mask.

The structure and semantics of the RNACK message are similar to that of the AVPF Generic NACK message.

FIG. 18 shows the exemplary syntax of the RNACK Feedback Control Information (FCI) field in which individual fields are defined as follows:

R Packet Sequence Number (RSEQ): 16 bits
The RSEQ field indicates a RSEQ value that the receiver has not received.

Series ID (SER): 4 bits
An identifier of which sequence of R packets is being described as being lost by this header extension element.

Bitmask of following Lost R Packets (BLR): 12 bits
The BLR allows for reporting losses of any of the 12 R Packets immediately following the RTP packet indicated by RSEQ. Denoting the BLP's least significant bit as bit 1, and its most significant bit as bit 12, then bit i of the bit mask is set to 1 if the receiver has not received R packet number (RSEQ+i) in the series SER (modulo $2^{16}$) and indicates this packet is lost; bit i is set to 0 otherwise. Note that the sender must not assume that a receiver has received an R packet because its bit mask was set to 0. For example, the least significant bit of the BLR would be set to 1 if the packet corresponding to RSEQ and the following R packet in the sequence had been lost. However, the sender cannot infer that packets RSEQ+2 through RSEQ+16 have been received simply because bits 2 through 15 of the BLR are 0; all the sender knows is that the receiver has not reported them as lost at this time.

The structure of the RNACK message shown in FIG. 18 is identical to the one described in International patent application No. PCT/US06/061815.

The second exemplary detection technique, which allows a receiver to detect that an LR picture (including SR pictures) has been lost with a minimal delay, is applicable to the systems based on the H.264 SVC draft standard. In such case H.264 SVC NAL units are used as the basis for transmission. International patent application No. PCT/US06/61815 describes how the LR picture index technique may be applied in this case as well. As with the RTP embodiment, the present invention introduces two single-bit flags to address the case where multiple packets are used for transport of a given LR picture.

FIG. 19 shows the structure of the inventive H.264 SVC NAL header extension modified to include the start and end flags, using as the basis the syntax of the H.264 SVC draft (see e.g., T. Wiegand, G. Sullivan, J. Reichel, H. Schwarz, M. Wien, eds., "Joint Scalable Video Model 8: Joint Draft 8 with proposed changes," Joint Video Team, Doc. JVT-U202, Hangzhou, October 2006, incorporated herein by reference in its entirety). The start and end flags are the pic_start_flag and pic_end_flag, whereas the picture index is the t10_pic_idx parameter. The dependency_id (D), temporal_level (T), and quality_level (Q) fields indicate points in the spatial/coarse grain quality, temporal, and fine-grain quality dimensions respectively. In other words, they indicate the position of the NAL's payload in the set of resolutions provided by the scalable encoder. It is noted that the base layer in this scheme is identified by D=Q=T=0.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention. For example, alternative mechanisms for indicating the LR picture frame index value and referring to it in non-LR pictures may be used in accordance with the present invention both within an RTP transmission context and an H.264 SVC NAL transmission context. Similarly, alternative mechanisms for indicating the start and end flags may be used in both RTP and H.264 SVC. For example, the t10_pic_idx parameter and associated pic_start_flag and pic_end_flag parameters may be carried in an SEI message.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, microcontrollers, microprocessors, integrated circuits, ASICS, on-line downloadable media, and other available media.

The invention claimed is:

1. A system for media communications between a transmitting endpoint or server and one or more receiving endpoint(s) or server(s) over a packet-based communication network, the system comprising:
an encoder configured to use a threaded coding structure having a number of different layers including a lowest temporal layer, wherein each picture is associated with a picture index number;
wherein data corresponding to a single picture is portioned and transmitted in one or more individual data packets, wherein an individual data packet comprises data elements that indicate:
for the lowest temporal layer pictures, a sequence number identifying said pictures,
for other temporal layer pictures, a reference to the sequence number of the most recent, in decoding order, lowest temporal layer picture, and
for all pictures, a 'start' flag and an 'end' flag that respectively indicate if the individual data packet contains the first or last data portions of the picture,
so that a receiving endpoint or server on receipt of the individual data packet can detect a loss of portions of a lowest temporal layer picture by examining if all data portions of the picture corresponding to the referenced picture index have been received at the receiving endpoint or server such that their packet sequence numbers contain no gaps, and where the first such data portion has the 'start' bit set and the last such data portion has the 'end' bit set.

2. The system of claim 1 wherein the data elements additionally indicate a series number associated with each spatial or quality layer, wherein the receiving endpoint or server detects if a lowest temporal layer picture of a particular spatial or quality layer is lost by determining if the picture corresponding to the referenced series number and sequence number has been received at the receiving endpoint or server.

3. The system of claim 1 comprising a codec conforming to H.264, wherein the lowest temporal layer pictures include pictures that are marked as long term reference pictures, and wherein decoding of at least a portion of the received media based on a lowest temporal layer picture by a decoder is controlled by Memory Management Control Operation (MMCO) commands.

4. The system of claim 1 wherein the communication network uses the Internet Protocol, media transport is performed using real-time protocol (RTP), and the data elements include data to indicate presence of a lowest temporal layer frame or fragment thereof in the packet.

5. The system of claim 4 wherein a receiving endpoint or server sends a negative acknowledgment message to the transmitting endpoint or server in response to the receiving endpoint's or server's detection of a lost lowest temporal layer picture or portion of such picture.

6. The system of claim 5 wherein the transmitting endpoint or server upon receiving the negative acknowledgment message retransmit the lost lowest temporal layer picture or portion of such picture.

7. The system of claim 1, wherein the encoder conforms to H.264 Scalable Video Coding (SVC), and the data elements are carried in Network Adaptation Layer (NAL) unit header extension for SVC elements.

8. The system of claim 1, wherein the encoder conforms to H.264 SVC, and the data elements are carried in Supplemental Enhancement Information (SEI) message.

9. A method for media communications between a transmitting endpoint or server and one or more receiving endpoint(s) or server(s) over a packet-based communication network, wherein an encoder is configured to use a threaded coding structure having a number of different layers including a lowest temporal layer, and wherein data corresponding to a single picture is portioned and transmitted in one or more individual data packets, the method comprising:
placing in each individual data packet data elements that indicate:
for the lowest temporal layer pictures, a sequence or index number identifying said pictures,
for other temporal layer pictures, a reference to the sequence number of the most recent, in decoding order, lowest temporal layer picture, and
for all pictures, a 'start' flag and an 'end' flag that indicate if the individual data packet contains the first or last, respectively, data portions of the picture, so that a receiving endpoint or server on receipt of the individual data packet can detect a loss of portions of a lowest temporal layer picture by examining if all data portions of the picture corresponding to the referenced picture index have been received at the receiving endpoint or server such that their packet sequence numbers contain no gaps, and where the first such data portion has the 'start' bit set and the last such data portion has the 'end' bit set.

10. The method of claim 9 wherein the data elements additionally indicate a series number associated with each spatial or quality layer, so that the receiving endpoint or server detects if a lowest temporal layer picture of a particular spatial or quality layer is lost by determining if the picture corresponding to the referenced series number and sequence number has been received at the receiving endpoint or server.

11. The method of claim 9, wherein the transmitted media is coded using a codec conforming to H.264, wherein the lowest temporal layer pictures include pictures that are marked as long term reference pictures, and wherein decoding of at least a portion of the received media based on a lowest temporal layer picture by a decoder is controlled by Memory Management Control Operation (MMCO) commands.

12. The method of claim 9 wherein the communication network uses the Internet Protocol, media transport is performed using real-time transport protocol (RTP), and the data elements include data to indicate presence of a lowest temporal layer picture or fragment thereof in the packet.

13. The method of claim 12 wherein a receiving endpoint or server sends a negative acknowledgment message to the transmitting endpoint or server in response to the receiving endpoint's or server's detection of a lost lowest temporal layer picture or portion of such picture.

14. The method of claim 13 wherein the transmitting endpoint or server upon receiving the negative acknowledgment message retransmit the lost lowest temporal layer picture or portion of such picture.

15. The method of claim 14, wherein the encoder conforms to H.264 Scalable Video Coding (SVC), and the data elements are carried in Network Adaptation Layer (NAL) unit header extension for SVC elements.

16. The method of claim 9, wherein the encoder conforms to H.264 SVC, and the data elements are carried in Supplemental Enhancement Information (SEI) message.

17. A non-transitory computer readable medium comprising a set of instructions to direct a processor to perform the methods recited in one of claims 9-16.

* * * * *